United States Patent
Takahashi et al.

(10) Patent No.: US 6,341,487 B1
(45) Date of Patent: Jan. 29, 2002

(54) CATALYST TEMPERATURE CONTROL DEVICE AND METHOD OF INTERNAL COMBUSTION ENGINE

(75) Inventors: Hideaki Takahashi; Kimiyoshi Nishizawa, both of Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/537,515

(22) Filed: Mar. 29, 2000

(30) Foreign Application Priority Data

Mar. 30, 1999 (JP) .......................................... 11-087895

(51) Int. Cl.⁷ ................................................ F01N 3/00
(52) U.S. Cl. ............................. 60/286; 60/285; 60/297; 60/300; 123/295; 123/300; 123/430; 123/431
(58) Field of Search .......................... 60/285, 300, 286, 60/297, 303, 277; 123/299, 295, 300, 430, 431

(56) References Cited

U.S. PATENT DOCUMENTS

| | | | |
|---|---|---|---|
| 5,479,775 A | * 1/1996 | Kraemer et al. | 60/274 |
| 5,974,791 A | * 11/1999 | Hirota et al. | 60/276 |
| 5,975,045 A | * 11/1999 | Mizuno | 123/295 |
| 6,067,954 A | * 5/2000 | Kudou et al. | 123/299 |
| 6,141,960 A | * 11/2000 | Takami et al. | 60/286 |
| 6,173,571 B1 | * 1/2001 | Kaneko et al. | 60/286 |

FOREIGN PATENT DOCUMENTS

| | | |
|---|---|---|
| JP | 9-32619 | 2/1997 |
| JP | 9-242520 | 9/1997 |
| JP | 10-169488 | 6/1998 |

* cited by examiner

Primary Examiner—Thomas Denion
Assistant Examiner—Binh Tran
(74) Attorney, Agent, or Firm—Foley & Lardner

(57) ABSTRACT

A catalyst (9) is disposed in an exhaust passage (8) of an internal combustion engine (1) for trapping nitrogen oxides in the exhaust from a fuel mixture of a lean air-fuel ratio and reducing trapped nitrogen oxides in the exhaust from a fuel mixture of an air-fuel ratio other than the lean air-fuel ratio. The catalyst (9) also traps sulfur oxides in the exhaust when the catalyst temperature is less than a predetermined temperature, and discharges the trapped sulfur oxides when the catalyst temperature rises above the predetermined temperature. A microprocessor (10) calculates for example the sulfur oxide stored amount of the catalyst (9) based on engine running conditions, and determines that sulfur oxide discharge condition is satisfied when the sulfur oxide stored amount exceeds a predetermined amount. When the discharge condition is satisfied, the microprocessor (10) controls the fuel injection amount and fuel injection timing of the fuel injector (6) so as to generate a stratified air-fuel mixture in the combustion chamber (3). The stratified air-fuel mixture comprises a first layer surrounding the spark plug (7) and a second layer situated outside the first layer. The first layer comprises an atomized air-fuel mixture of a rich air-fuel ratio within an ignitable range. The second layer is leaner than the first layer.

28 Claims, 17 Drawing Sheets

CATALYST TEMPERATURE CONTROL DEVICE AND METHOD OF INTERNAL COMBUSTION ENGINE

FIELD OF THE INVENTION

This invention relates to discharge of sulfur oxides trapped by an exhaust purification catalyst of an internal combustion engine.

BACKGROUND OF THE INVENTION

Tokkai Hei 9-32619 published by the Japanese Patent Office in 1997 discloses a catalyst that has a function to trap nitrogen oxides (NOx) in the exhaust gas when fuel mixture having a lean air-fuel ratio is burnt in an internal combustion engine. The catalyst reduces the trapped nitrogen oxides when air-fuel mixture having a stoichiometric air-fuel ratio or rich air-fuel ratio is burnt.

The catalyst also traps sulfur oxides (SOx) as well as nitrogen oxides. When the amount of sulfur oxides trapped in the catalyst becomes large, storing capacity of nitrogen oxides becomes small, so it is necessary to occasionally discharge the trapped sulfur oxides. The trapped sulfur oxides are discharged when the temperature of the catalyst becomes high.

In order to raise the catalyst temperature, the prior art discloses performing an additional fuel injection in the exhaust stroke of the engine such that part of the injected fuel in the additional injection is burnt in the combustion chamber and the exhaust passage of the engine, and causes the exhaust temperature to rise.

The remainder of the fuel in the additional injection is directly burnt on the catalyst. By increasing the catalyst temperature in this way, the catalyst. is made to discharge the sulfur oxides.

Tokkai Hei 10-169488 published by the Japanese Patent Office in 1998 discloses increasing of the catalyst temperature by accumulating an air-fuel mixture having a rich air-fuel ratio around a spark plug.

Hydrocarbons (HC) and carbon monoxide (CO) which are produced by incomplete combustion of the rich air-fuel mixture are reacted with oxygen in the later part of the power stroke of the engine, thereby increasing the exhaust temperature, and this increases the catalyst temperature.

SUMMARY OF THE INVENTION

When fuel is burnt directly on the catalyst, the catalyst temperature rises sharply, and to control the temperature of the catalyst within a range which does not impair the durability of the catalyst while discharge of sulfur oxides is being performed, the amount of fuel in the additional injection needs to be precisely controlled.

In general, in a fuel injector, the precision of the injection amount is poorer the smaller the injection amount, and the additional injection amount is much smaller than the main injection amount. In the method of Tokkai Hei 9-32619, therefore, it is difficult to control the injection amount precisely enough for catalyst temperature management.

Tokkai Hei 10-169488 sets the air-fuel ratio of the air-fuel mixture surrounding the spark plug very rich so that it easily causes a misfire. In this condition, the air-fuel mixture can only ignite when the leading edge of the fuel spray reaches the spark plug.

That is, the ignition timing at which the air-fuel mixture can fire is very much restricted, and any shift in the ignition timing causes a misfire, and if a misfire occurs when discharge of sulfur oxides is being performed, a large amount of fuel will flow into the fully activated catalyst, and the durability of the catalyst will be impaired.

It is therefore an object of this invention to perform sulfur oxide discharge from a catalyst without affecting the durability of the catalyst.

It is a further object of this invention to facilitate discharge of sulfur oxides from the catalyst.

In order to achieve the above objects, this invention provides a catalyst temperature control device for use with an internal combustion engine. The engine comprises a combustion chamber, a fuel injector which injects fuel into the combustion chamber, a spark plug which ignites an air-fuel mixture inside the combustion chamber, an exhaust passage which discharges exhaust in the combustion chamber, and a catalyst provided in the exhaust passage for trapping nitrogen oxides in the exhaust from a fuel mixture of a lean air-fuel ratio and reducing trapped nitrogen oxides in the exhaust from a fuel mixture of an air-fuel ratio other than the lean air-fuel ratio. The catalyst also traps sulfur oxides in the exhaust when a catalyst temperature is less than a predetermined temperature, and discharges trapped sulfur oxides when the catalyst temperature is greater than the predetermined temperature. The catalyst temperature control device comprises a sensor which detects an engine running state and a microprocessor programmed to determine whether or not a condition for discharging the sulfur oxides trapped by the catalyst is satisfied based on the running state, and control a fuel injection amount and a fuel injection timing of the fuel injector, when the discharging condition is satisfied, so as to generate a stratified air-fuel mixture in the combustion chamber. Herein, the stratified air-fuel mixture comprises a first layer surrounding the spark plug, and a second layer situated outside the first layer. The first layer comprises an atomized air-fuel mixture of a rich air-fuel ratio within an ignitable range, and the second layer is leaner than the first layer This invention also provides a catalyst temperature control device comprising a mechanism for detecting an engine running state, a mechanism for determining whether or not a condition for discharging the sulfur oxides trapped by the catalyst is satisfied based on the running state; and a mechanism for controlling a fuel injection amount and a fuel injection timing of the fuel injector, when the discharging condition is satisfied, so as to generate a stratified air-fuel mixture in the combustion chamber. The stratified air-fuel mixture comprises a first layer surrounding the spark plug and a second layer situated outside the first layer. The first layer comprises an atomized air-fuel mixture of a rich air-fuel ratio within an ignitable range, and a second layer is leaner than the first layer.

This invention also provides a catalyst temperature control method for such an internal combustion engine that comprises a combustion chamber, a fuel injector which injects fuel into the combustion chamber, a spark plug which ignites an air-fuel mixture inside the combustion chamber, an exhaust passage which discharges exhaust in the combustion chamber, and a catalyst provided in the exhaust passage for trapping nitrogen oxides in the exhaust from a fuel mixture of a lean air-fuel ratio and reducing trapped nitrogen oxides in the exhaust from a fuel mixture of an air-fuel ratio other than the lean air-fuel ratio. The catalyst also traps sulfur oxides in the exhaust when a catalyst temperature is less than a predetermined temperature, and discharges trapped sulfur oxides when the catalyst temperature is greater than the predetermined temperature. The control method comprises detecting an engine running state, determining whether or not a condition for discharging the sulfur oxides trapped by the catalyst is satisfied based on the running state, and controlling a fuel injection amount and a fuel injection timing of the fuel injector, when the discharging condition is satisfied, so as to generate a stratified air-fuel mixture in the combustion chamber. The stratified air-fuel mixture comprises a first layer surrounding the spark plug and a second layer a situated outside the first layer. The first layer comprises an atomized air-fuel mixture of a rich air-fuel ratio within an ignitable range, and the second layer is leaner than the first layer The details as well as other features and advantages of this invention are set forth in the remainder of the specification and are shown in the accompanying drawings.

DESCRIPTION OF THE PREFERRED EMBODIMENTS

Figure 1:
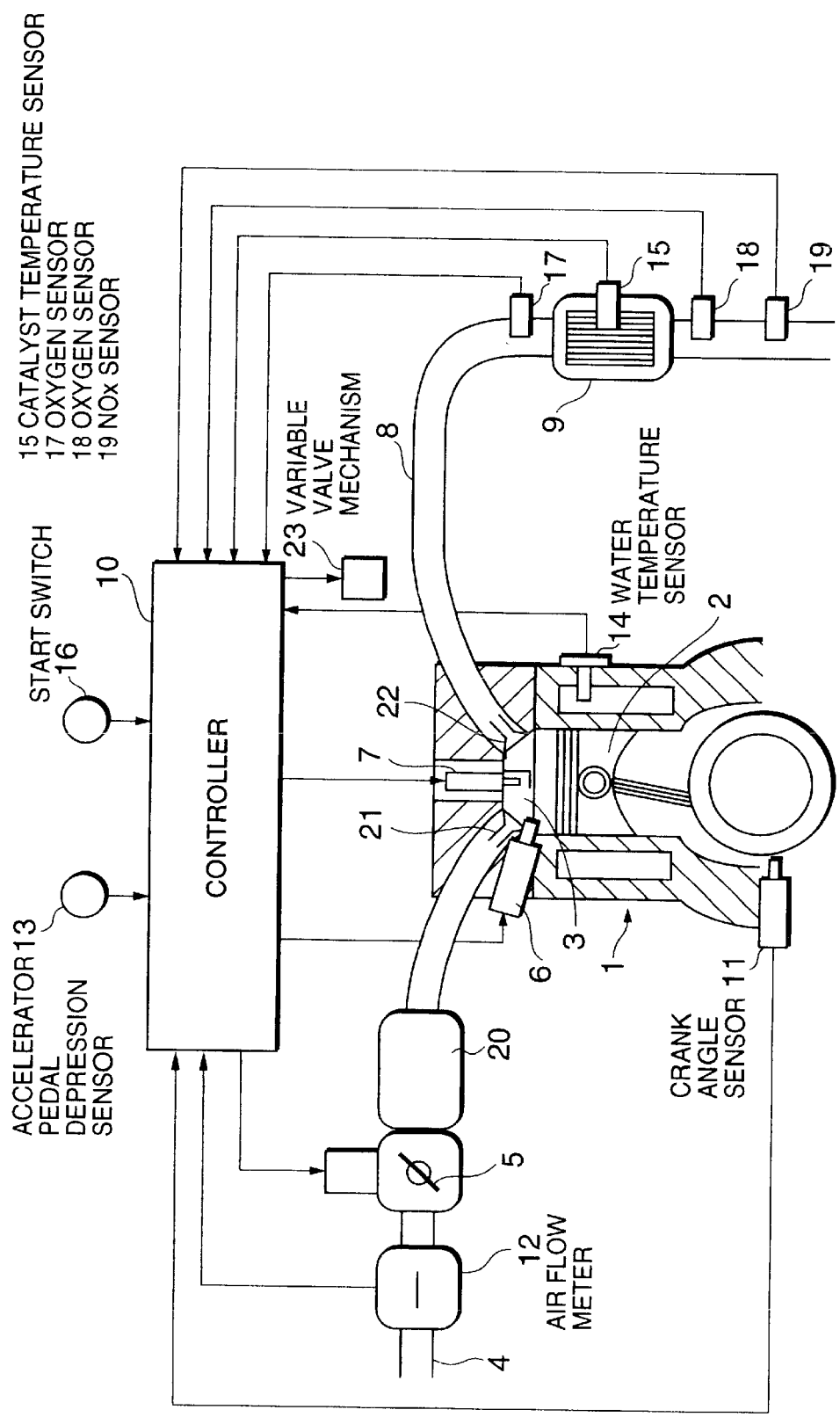
FIG. 1 is a schematic diagram of a control device of an internal combustion engine according to this invention.

Referring to FIG. 1 of the drawings, a direct injection-spark ignition internal combustion engine 1 for vehicles comprises a combustion chamber 3 formed by a piston 2.

Air is aspirated through a collector 20 and intake valve 21 from an intake passage 4 in the combustion chamber 3.

An amount of the aspirated air is regulated by an electronic throttle 5 disposed in the intake passage 4.

The electronic throttle 5 comprises an actuator such as a stepping motor controlled by a controller 10, which controls the opening of the throttle 5. The controller 10 calculates a target throttle opening based mainly on an accelerator pedal depression amount (accelerator opening) of the vehicle, and outputs a corresponding throttle opening signal to the actuator.

The engine 1 comprises an electromagnetic fuel injector 6 which injects fuel to the combustion chamber 3, and a spark plug 7 which spark ignites the injected fuel.

The injection timing and injection amount of the fuel injector 6 are controlled by the controller 10.

The controller 10 outputs an injection pulse signal to the fuel injector 6 at a predetermined rotation angle of the engine 1 for a predetermined period.

The fuel injector 6 comprises a solenoid valve which opens and closes in response to an injection pulse signal.

Fuel injected in the combustion chamber 3 from the fuel injector 6 in the intake stroke of the piston 2 diffuses in the combustion chamber 3, and mixes with air aspirated from the intake passage 4 to form a homogeneous air-fuel mixture.

On the other hand, fuel injected in the combustion chamber 3 from the fuel injector 6 in the compression stroke of the piston 2 forms a layer of an air-fuel mixture surrounding the spark plug 7.

These air-fuel mixtures are ignited by the spark plug 7 in response to an ignition signal from the controller 10. In the case of a homogeneous air-fuel mixture, uniform combustion is thereby performed, and in the case of a stratified air-fuel mixture, stratified combustion is thereby performed.

Exhaust gas produced by combustion of the air-fuel mixture of the combustion chamber 3 is ejected into the atmosphere via an exhaust passage 8 from an exhaust valve 22.

The valve opening timing of the exhaust valve 22 is controlled by a variable valve mechanism 23.

The variable valve mechanism 23 is known for example from Tokkai Hei 9-242520 published by the Japanese Patent Office in 1997.

A catalytic converter 9 for exhaust purification is disposed in the exhaust passage 8.

The catalytic converter 9 comprises a three-way catalyst which promotes oxidation of carbon monoxide (CO) and hydrocarbon (HC) and reduction of nitrogen oxides (NOx) contained in burnt gas from air-fuel mixtures near the stoichiometric air-fuel ratio. The catalyst, containing platinum (Pt), also functions to trap nitrogen oxides (NOx) in burnt gas from air-fuel mixtures having a lean air-fuel ratio. It reduces them when an air-fuel mixture having a stoichiometric air-fuel ratio or rich air-fuel ratio is burnt in the combustion chamber 3

The catalyst also has a characteristic such that it traps sulfur oxides when the catalyst temperature is within a certain range, and discharges the trapped sulfur oxides when the catalyst temperature becomes higher.

The controller 10 comprises a microcomputer equipped with a central processing unit (CPU), read-only memory (ROM), random access memory (RAM), and input/output Interface (IO interface).

For the control of the electronic control throttle 5, fuel injector 6, spark plug 7 and the variable valve mechanism 23 performed by the controller 10, signals are input to the controller 10 from a crank angle sensor 11 which detects the crank angle of the engine 1, an air flow meter 12 which detects an intake flowrate Qa of the intake passage 4 upstream of the throttle 5, an accelerator pedal position sensor 13 which detects an accelerator depression amount (accelerator opening) APO of an accelerator pedal, a water temperature sensor 14 which detects a cooling water temperature Tw of the engine 1, a catalyst temperature sensor 15 which detects a catalyst temperature Tcat of the catalytic converter 9, a starter switch 16 which detects start-up of the engine 1, an oxygen sensor 17 which detects the oxygen concentration of the exhaust in the exhaust passage 8 upstream of the catalytic converter 9, an oxygen sensor 18 which detects the oxygen concentration of the exhaust in the exhaust passage 8 down stream of the catalytic converter 9, and a NOx sensor 19 which detects the nitrogen oxide concentration of the exhaust in the exhaust passage 8 downstream of the catalytic converter 9.

In the following description, the oxygen sensor 17 is referred to as a front oxygen sensor, and the oxygen sensor 18 is referred to as a rear oxygen sensor.

The object of providing the rear oxygen sensor 18 is to eliminate control error due to degeneration of the front oxygen sensor 17. Therefore, the rear oxygen sensor 18 is not essential to achieving the object of this invention, and may be omitted.

Based on the input signals from these sensors, the controller 10 controls the opening of the electronic throttle 5, controls the fuel injection amount and fuel injection timing of the fuel injector 6, controls the ignition timing of the spark plug 7, and controls the valve opening timing of the exhaust valve 22 by the variable valve mechanism 23.

In particular, by controlling the fuel injection timing, fuel is injected into the combustion chamber 3 in the compression stroke of the piston 2 in the steady low and medium load regions of the engine 1, and a layer of a stoichiometric air-fuel mixture is formed only around the spark plug 7 in the combustion chamber 3.

In other running regions including the high load region, fuel is injected in the combustion chamber 3 in the intake stroke, and uniform combustion is performed due to the uniformly spread air-fuel mixture having a uniform air-fuel ratio through the whole of the combustion chamber 3.

As regards the air-fuel ratio, the air-fuel ratio of the whole combustion chamber 3 is controlled to a lean air-fuel ratio during stratified combustion, and is controlled to a stoichiometric air-fuel ratio or a rich air-fuel ratio during uniform combustion.

In general, the engine 1 selectively performs one of stratified lean combustion, uniform stoichiometric combustion and uniform rich combustion according to engine running conditions.

Further, the engine 1 performs a specific stratified combustion which has the particular object of increasing the exhaust temperature for the purpose of discharging sulfur oxides trapped by the catalyst in the catalytic converter 9.

In this stratified combustion for raising the exhaust temperature, the air-fuel ratio of the whole air-fuel mixture is controlled to the stoichiometric air-fuel ratio or a slightly rich air-fuel ratio. In order to realize such a combustion, the fuel supply amount in one combustion cycle is determined, and fuel delivery in the determined fuel injection amount is achieved by an intake stroke injection and a compression stroke injection.

Figure 2A:
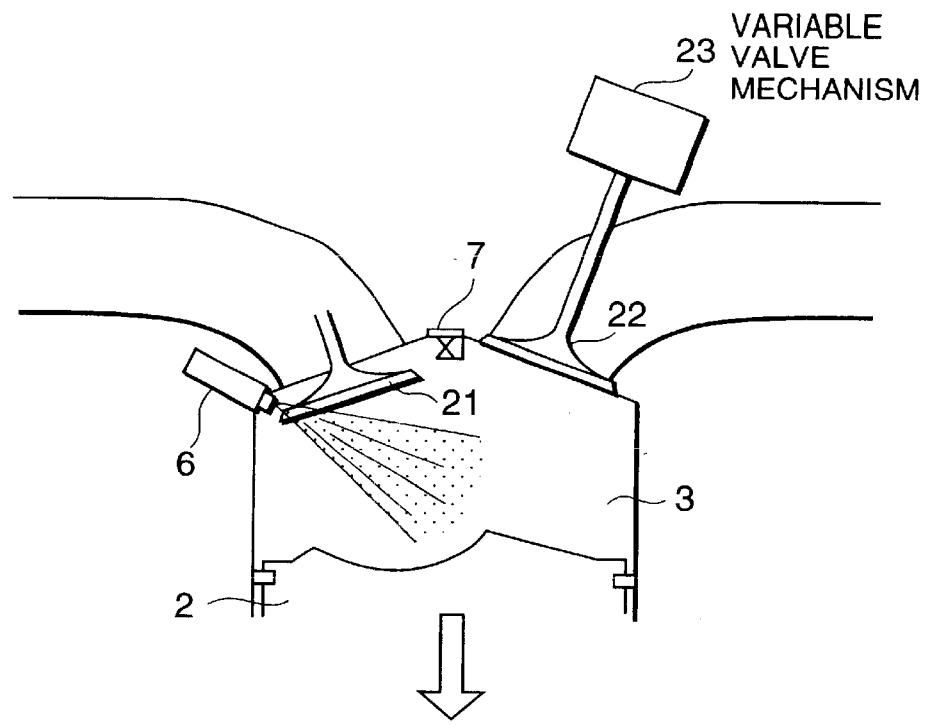
FIGS. 2A and 2B are schematic vertical cross-sectional views of a combustion chamber of the engine describing a stratified stoichiometric combustion.

Specifically, of the total fuel injection amount per combustion cycle, approximately 50 weight %–90 weight % is for example injected into the combustion chamber 3 in the intake stroke of the piston 2 so that a comparatively lean uniform air-fuel mixture spreads through the whole of the combustion chamber 3, as shown in FIG. 2A.

Figure 2B:
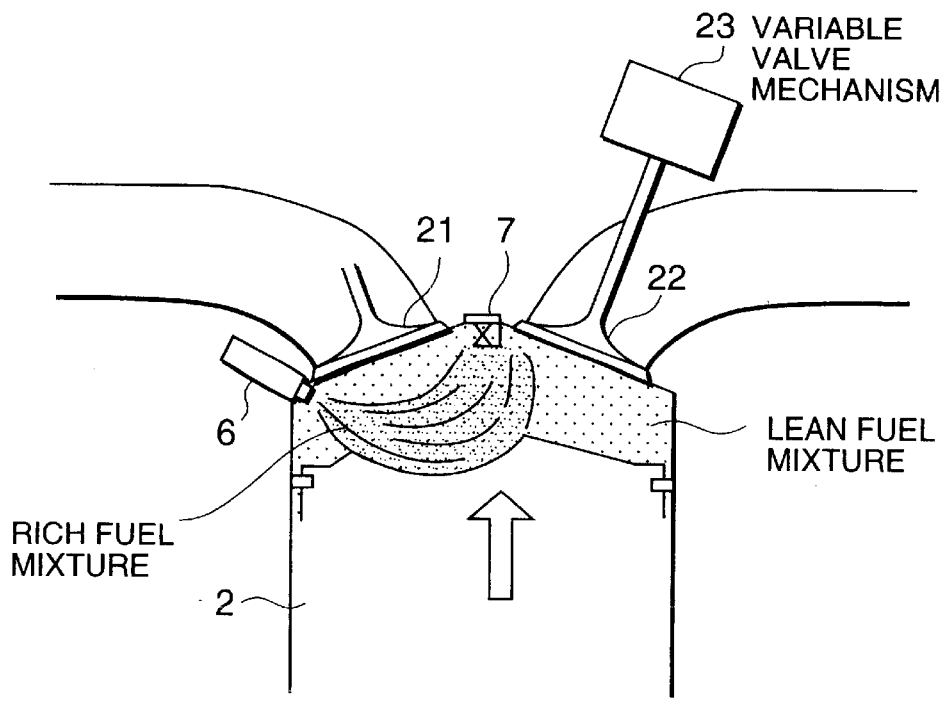

The remaining 50 weight %–10 weight % of fuel is injected into the combustion chamber 3 in the compression stroke of the piston 2, and a layer of a rich air-fuel mixture is formed around the spark plug 7, as shown in FIG. 2B.

Figure 3:
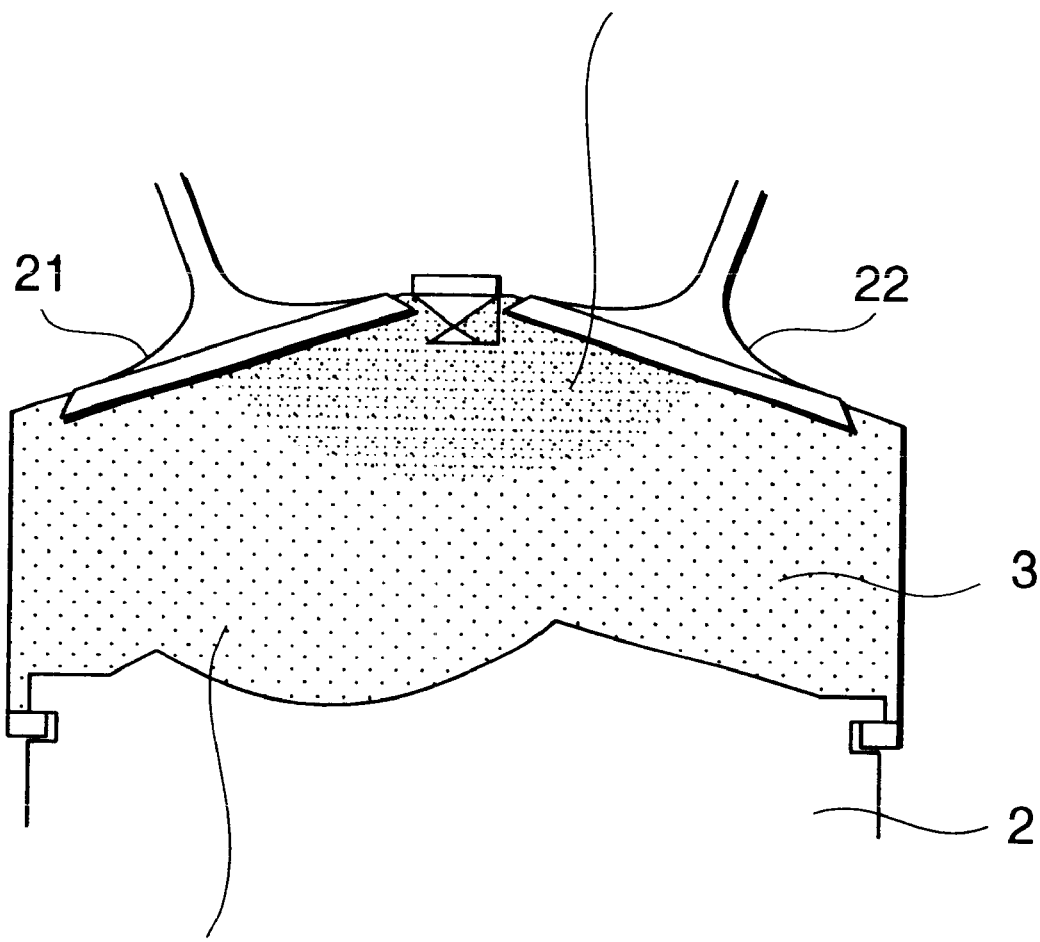
FIG. 3 is a schematic vertical cross-sectional view of the combustion chamber describing the distribution of an air-fuel mixture in stratified stoichiometric combustion.

Consequently, as shown in FIG. 3, the spark plug 7 causes ignition when the region around the spark plug 7 is filled with a rich air-fuel mixture and other parts of the combustion chamber 3 are filled with a lean air-fuel mixture. In other words, the fuel injection is divided between the intake stroke and the compression stroke so that the air-fuel ratio of the lean air-fuel mixture formed in the combustion chamber 3 in the intake stroke is 16–28, and the air-fuel ratio of the rich air-fuel layer formed around the spark plug 7 in the compression stroke is 9–13.

If such a stratified combustion is performed, a large amount of carbon monoxide is generated as an incomplete combustion product during the main combustion of the air-fuel layer around the spark plug 7, and, this carbon monoxide remains in the combustion chamber 3 after the main combustion.

Here, main combustion means firing due to spark ignition, and combustion due to the subsequent flame propagation.

On the other hand, since there is a leaner air-fuel layer than that with the stoichiometric air-fuel ratio around the rich air-fuel layer, oxygen remains in this region also after the main combustion.

The carbon monoxide and oxygen remaining after the main combustion are mixed due to the gas flow in the cylinder after the main combustion and are reburnt, so the exhaust temperature rises. This higher temperature exhaust gas causes the catalyst temperature in the catalytic converter 9 to rise higher than the sulfur oxide discharge temperature.

By setting the air-fuel ratio of the rich air-fuel layer within such a rich air-fuel ratio range that produces easier ignition than the stoichiometric air-fuel ratio, and by providing a sufficient time for atomization of the injected fuel, stable firing is always obtained.

On the other hand, as the air-fuel ratio of the lean air-fuel layer outside the rich air-fuel layer is a lean air-fuel ratio at which flame can be propagated, the flame propagates well to all corners of the combustion chamber 3, and the low temperature region (quenching area) responsible for producing unburnt HC can be reduced.

Hence, oxidation products which are reburnt after the main combustion are limited to carbon monoxide generated from the rich air-fuel layer. The limiting of oxidation products to carbon monoxide contributes to stability of catalyst temperature increase characteristics.

Therefore, due to stratified combustion performed to increase the catalyst temperature, discharge of sulfur oxides trapped by the catalyst takes place without fail.

Next, the control performed by the controller 10 to achieve stratified combustion so as to increase the catalyst temperature will be described referring to the flowcharts of FIGS. 4–12.

Figure 4:
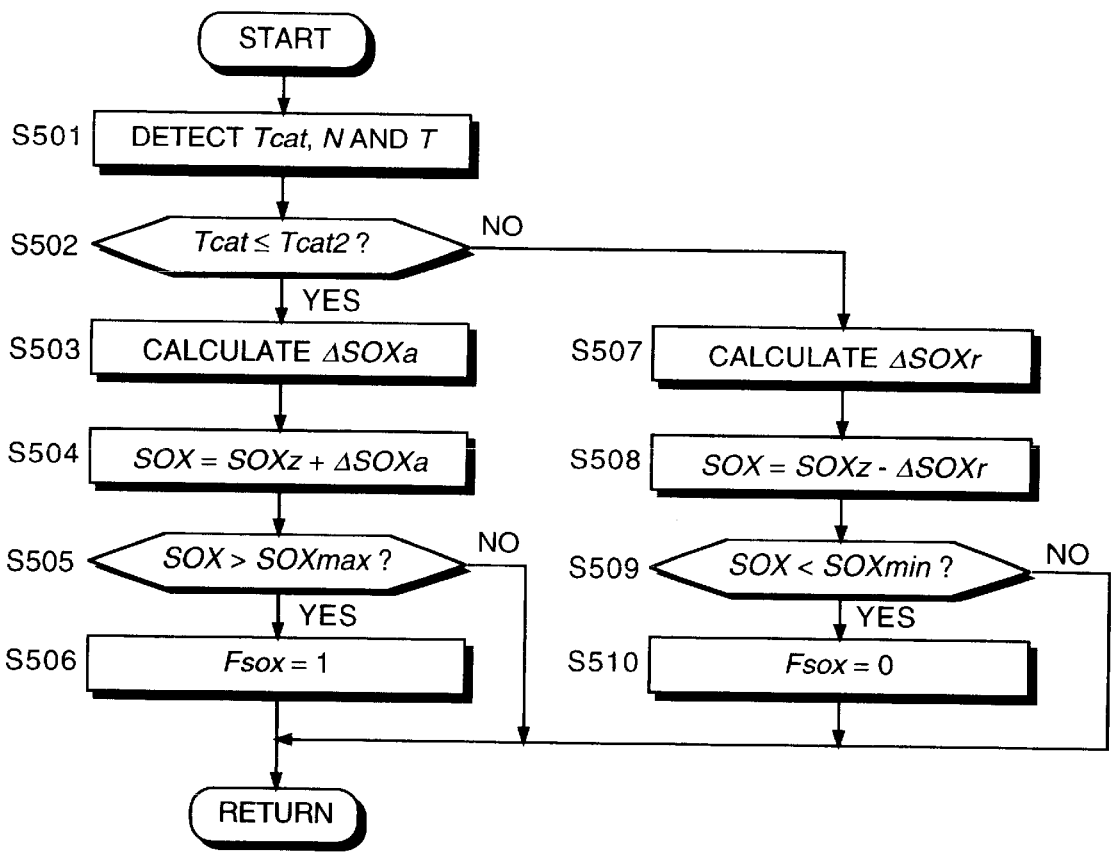
FIG. 4 is a flowchart describing a sulfur oxide discharge condition determining routine performed by a controller according to this invention.

FIG. 4 shows a sulfur oxide discharge condition determining routine.

This routine is performed by the controller 10 at an interval of, for example, 10 milliseconds. The essential feature of the routine is estimating a sulfur oxide stored amount SOX stored by the catalyst. When the sulfur oxide stored amount SOX exceeds an upper limiting value SOXmax, a discharge flag Fsox is set to 1, and when the sulfur oxide stored amount SOX is less than a lower limiting value SOXmin, the flag Fsox is reset to 0.

Therefore, firstly in a step S501, the output signal of a catalyst temperature sensor 15 is A/D converted, and a catalyst temperature Tcat is calculated. The rotation speed N of an engine 1 is calculated based on the output signal of the crank angle sensor 11. An engine load T is also calculated based on the output signal of the accelerator pedal position sensor 13. The catalyst temperature Tcat can also be estimated from the engine speed N and engine load.

In a step S502, it is determined whether or not the catalyst temperature Tcat is less than the sulfur oxide discharge temperature Tcat2. If Tcat≦Tcat2, temperature conditions are satisfied for trapping sulfur oxides, and the routine proceeds to a step S503.

In the step S503, a sulfur oxide amount ΔSOXa trapped by the catalyst in the 10 milliseconds routine execution interval is calculated by the following equation.

ΔSOXa=(sulfur oxide amount flowing into converter in unit time)·(sulfur oxide trapping coefficient of catalyst)

The amount of sulfur oxides flowing into the catalytic converter 9 in 10 milliseconds is calculated as a parameter of, for example, the engine rotation speed N, engine load T, and the mean air-fuel ratio of the combustion chamber 3. A target equivalence ratio TFBYA set by a target air-fuel ratio setting routine described later can be used for the mean air-fuel ratio. Here, an equivalence ratio is defined as follows based on "The Internal Combustion Engine" by John B. Heywood (ISBN0-07-028637-X).

$$\text{Equivalence ratio} = \frac{\text{fuel} - \text{air ratio}}{\text{stoichiometric fuel} - \text{air ratio}}$$

The fuel-air ratio is the inverse of the air-fuel ratio. Therefore, the equivalence ratio equivalent to the stoichiometric air-fuel ratio is equal to 1, an equivalence ratio corresponding to a lean air-fuel ratio is a value smaller than 1, and an equivalence ratio corresponding to a rich air-fuel ratio is a value larger than 1.

The sulfur oxide trapping coefficient of the catalyst is defined as follows.

Sulfur oxide trapping coefficient =

$$\frac{\text{sulfur oxide trapping amount per unit time}}{\text{sulfur oxides flowing into the converter per unit time}}$$

This value is calculated as a parameter of, for example, the catalyst temperature Tcat and mean air-fuel ratio.

By the above definition, the sulfur oxide trapping coefficient of the catalyst is a value from 0 to 1, and it has the following characteristics relative to various parameters.

The sulfur oxide trapping coefficient is a maximum when the catalyst temperature is a predetermined temperature, the sulfur oxide trapping coefficient decreases the lower the catalyst temperature is below the predetermined temperature, and is 0 when the catalyst temperature is lower than the catalyst activation temperature. Also, the sulfur oxide trapping coefficient decreases the higher the catalyst temperature is above the predetermined temperature, and is 0 above the sulfur oxide discharge temperature. At a lean air-fuel ratio, the sulfur oxide trapping coefficient decreases the nearer the air-fuel ratio approaches the stoichiometric air-fuel ratio, and is 0 at a rich air-fuel ratio.

In the following step S504 ΔSOXa is added to the sulfur oxide stored amount SOXz calculated on the immediately preceding occasion the routine was executed to give the newest sulfur oxide stored amount SOX.

SOX=SOXz+ΔSOXa

In the next step S505, it is determined whether or not the sulfur oxide stored amount SOX is larger than a upper limiting value SOXmax. The upper limiting value SOXmax is set so that a predetermined nitrogen oxide trapping capacity NOXth remains in the catalyst.

If SOX>SOXmax in the step S505, the routine proceeds to a step S506. In the step S506, a flag Fsox showing whether or not sulfur oxide discharge conditions are satisfied is set to 1, and the routine is terminated. If SOX≦SOXmax, the flag Fsox is held at its current value, and the routine is terminated.

If on the other hand, Tcat>Tcat2 in the step S502, it means that the catalyst is discharging sulfur oxides. In this case, the routine proceeds to a step S507, and a sulfur oxide amount ΔSOXr discharged by the catalyst in 10 milliseconds is calculated by the following equation.

ΔSOXr=(10 milliseconds)·(sulfur oxide discharge rate of catalyst)

The sulfur oxide discharge rate of the catalyst is a sulfur oxide amount discharged per unit time, and is calculated based on a sulfur oxide stored amount SOXz on the immediately preceding occasion the routine was executed, the catalyst temperature Tcat, and the mean air-fuel ratio as parameters.

The target equivalence ratio TFBYA can be used for the mean air-fuel ratio. However, although during discharge of sulfur oxides the equivalence ratio TFBYA is basically set to 1, the control midpoint of air-fuel ratio feedback control may be shifted to rich to make the air-fuel ratio richer. In this case, the mean air-fuel ratio is determined taking account also of the amount of rich shift.

The sulfur oxide discharge rate of the catalyst has the following characteristics relative to each parameter.

The sulfur oxide discharge rate is smaller the less the sulfur oxide stored amount, and when the sulfur oxide stored amount is 0, the sulfur oxide discharge rate is also 0. The sulfur oxide discharge rate is smaller the lower the catalyst temperature, and the sulfur oxide discharge rate is 0 below the sulfur oxide discharge temperature. At a rich air-fuel ratio, the sulfur oxide discharge rate decreases as the stoichiometric air-fuel ratio is approached, and at a lean air-fuel ratio it is 0.

In the next step S508, ΔSOXr is subtracted from the sulfur oxide stored amount SOXz calculated on the immediately preceding occasion the routine was executed to compute the newest sulfur oxide stored amount SOX.

SOX=SOXz−ΔSOXr

In the next step S509, it is determined whether or not the sulfur oxide stored amount SOX is less than the lower limiting value SOXmin. The lower limiting value SOXmin is set to 0 or a value near to 0.

If SOX<SOXm in in the step S509, the routine proceeds to a step S510.

In the step S510, the flag Fsox showing whether or not sulfur oxide discharge conditions are satisfied is reset to 0, and the routine is terminated.

On the other hand, if SOX≧SOXmin, the discharge flag Fsox is held at its current value, and the routine is terminated.

Due to the above routine, once the estimated sulfur oxide stored amount SOX exceeds the upper limiting value SOXmax, Fsox=1 is maintained until the trapped sulfur oxides have been almost completely discharged. This is to prevent discharge control of sulfur oxides from being frequently canceled.

The sulfur oxide stored amount SOX can also be calculated more simply. For example, the steps S503 and S507 may be omitted, and ΔSOXa and ΔSOXr of the steps S504 and S508 can be set to fixed values. Further, as the trapping and discharge of sulfur oxides take place relatively slowly, the routine execution time interval may be extended to 1 sec or 10 secs.

The sulfur oxides trapped in the catalyst remain trapped in the catalyst even after the engine stops, so the estimated sulfur oxide stored amount SOX is also stored after the engine stops, and this stored sulfur oxide stored amount SOX is used as an initial value in subsequent calculations of the sulfur oxide stored amount SOX the next time the engine starts.

Figure 5:
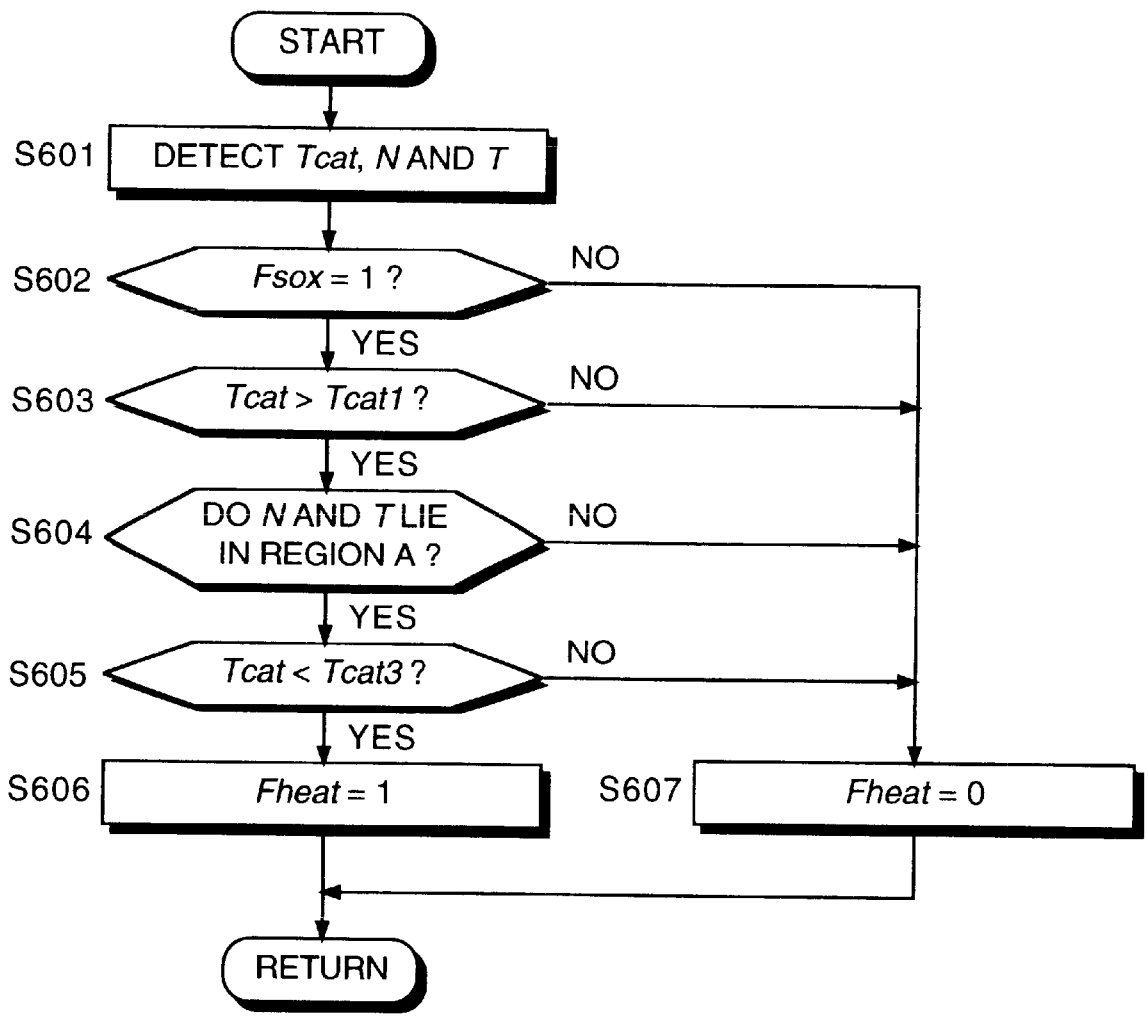
FIG. 5 is a flowchart describing a catalyst temperature increase condition determining routine performed by the controller.

FIG. 5 shows a catalyst temperature increase condition determining routine of the catalytic converter 9. This routine is performed by the controller 10 at an interval of, for example, 10 milliseconds. The essential feature of the routine is that when conditions are satisfied to increase catalyst temperature based on the flag Fsox and catalyst temperature Tcat, a temperature increase flag Fheat is set to 1, and when these conditions are not satisfied, the temperature increase flag Fheat is reset to 0.

In a step S601, the catalyst temperature Tcat, engine rotation speed N and engine load T are calculated as in the step S501.

In a step S602, it is determined whether or not the sulfur oxide discharge flag Fsox is 1. When Fsox is 1, in a step S603, it is determined whether or not the catalyst temperature Tcat is higher than a predetermined temperature Tcat1. The predetermined value Tcat1 is set lower than a sulfur oxide discharge temperature Tcat2.

When the catalyst temperature Tcat is equal to or less than Tcat1, to increase the temperature above the sulfur oxide discharge temperature Tcat2, special engine control to increase catalyst temperature must be performed for a long time, and emissions and fuel-cost performance are adversely affected. Hence, when the catalyst temperature is equal to or less than Tcat1, control to increase catalyst temperature is no t performed. However, even when the catalyst temperature is equal to or less than Tcat and the engine rotation speed N and engine load T are, for example, in a region B of FIG. 14, the catalyst temperature rises quickly when engine control to produce catalyst temperature increase is performed. Therefore, even if the catalyst temperature is equal to or less than Tcat, engine control to increase catalyst temperature may be permitted in the region B.

Figure 14:
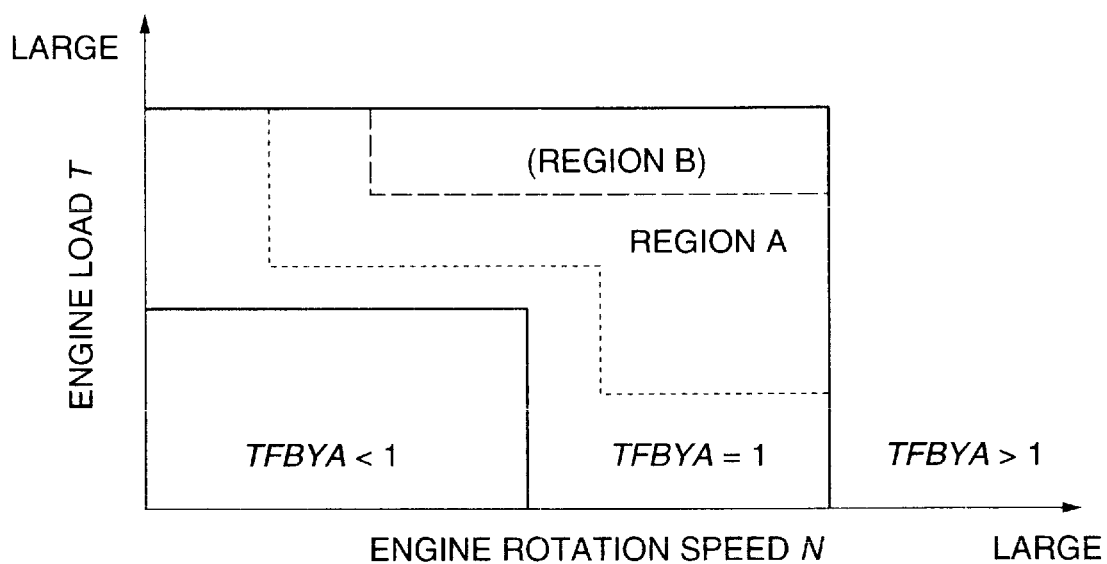
FIG. 14 is a diagram describing an operating range map stored by the controller.

In a step S604, it is determined whether or not the engine rotation speed N and engine load T are in a region A of FIG. 14. The region A is a region in which the catalyst temperature can be easily raised above the sulfur oxide discharge temperature Tcat2.

Depending on the engine, it may be possible to increase the catalyst temperature Tcat above the SOx discharge temperature Tcat2 if exhaust temperature increase engine control were performed, even in a running region having a lean air-fuel ratio. In such a case, the overlapping region between a region in which exhaust temperature increase is possible and a region in which the vehicle runs at the stoichiometric air-fuel ratio may be set as the region A so that running at a lean air-fuel ratio is not impaired. Alternatively, all the regions in which exhaust temperature increase is possible may be set as the region A, and when sulfur oxide discharge conditions are satisfied, i.e., Fsox=1, priority given to catalyst temperature increase control over lean running.

In a step S605, it is determined whether or not the catalyst temperature Tcat is smaller than a allowable maximum temperature Tcat3. The allowable maximum temperature Tcat3 is set to a larger value than Tcat2.

The catalyst discharges sulfur oxides more easily the higher the temperature, but if the catalyst temperature is increased too much, it will impair the durability of the catalyst so exhaust temperature increase control is not performed at Tcat3 and above.

If the results of all the determinations from the step S602 to the step S605 are affirmative, conditions for increasing catalyst temperature are satisfied, the routine proceeds to a step S606, the temperature increase flag Fheat is set to 1, and the routine is terminated.

When the result of any of the determinations from the step S602 to the step S05 is negative, the routine proceeds to a step S607, the temperature increase flag Fheat is reset to 0 and the routine is terminated.

Figure 6:
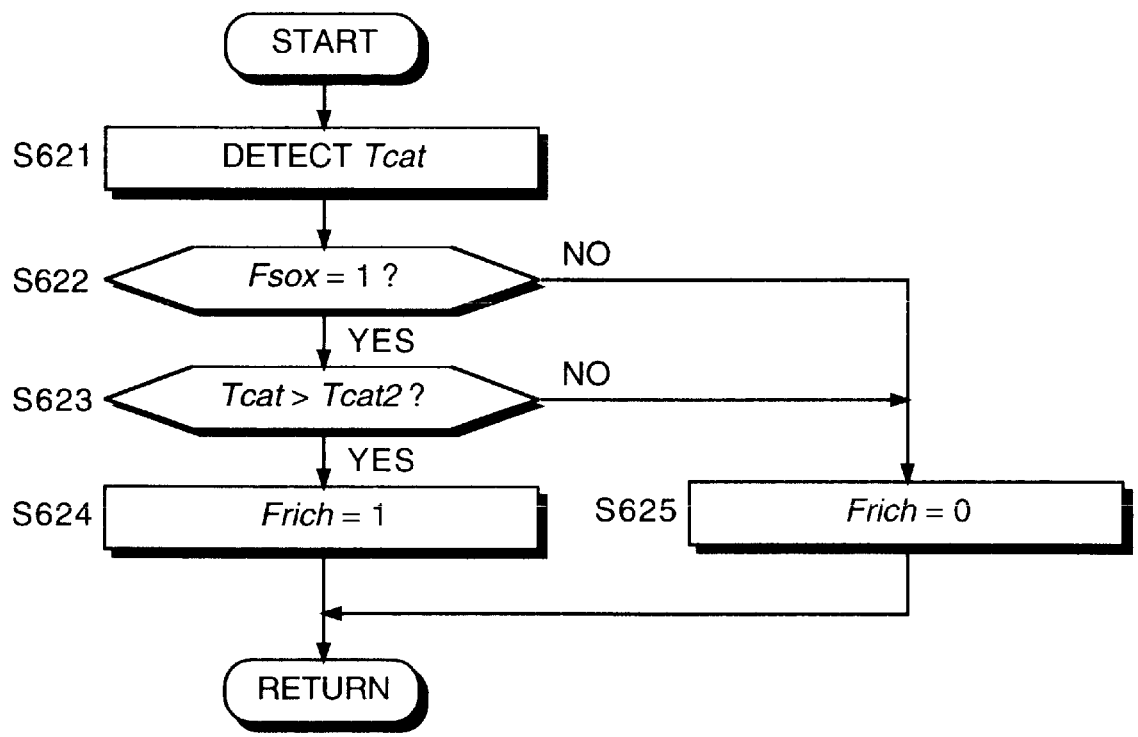
FIG. 6 is a flowchart describing an enrichment condition determining routine performed by the controller.

FIG. 6 shows an air-fuel ratio rich condition determining routine. This routine is performed by the controller 10 at an interval of 10 milliseconds.

The essential feature of this routine is that when air-fuel ratio enriching conditions are satisfied based on the sulfur oxide discharge flag Fsox and catalyst temperature Tcat, an enriching flag Frich is set to 1, and when air-fuel ratio enriching conditions are not satisfied, the enriching flag Frich is set to 0.

In a step S621, the catalyst temperature Tcat is calculated as in the aforesaid routines.

In a step S622, it is determined whether or not the sulfur oxide discharge flag Fsox is 1.

When the sulfur oxide discharge flag Fsox is 1, in a step S623, it is determined whether or not the catalyst temperature Tcat exceeds the sulfur oxide discharge temperature Tcat2.

When the catalyst temperature Tcat exceeds the sulfur oxide discharge temperature Tcat2 the routine proceeds to a step S624.

Here, the air-fuel ratio is made rich to promote discharge of sulfur oxides, the enriching flag Frich is set to 1 to reduce and purify the discharged sulfur oxides, and the routine is terminated.

When either of the determinations of the steps S622 or S623 is negative, the routine proceeds to a step S625, the enriching flag Frich is reset to 0, and the routine is terminated.

Figure 7:
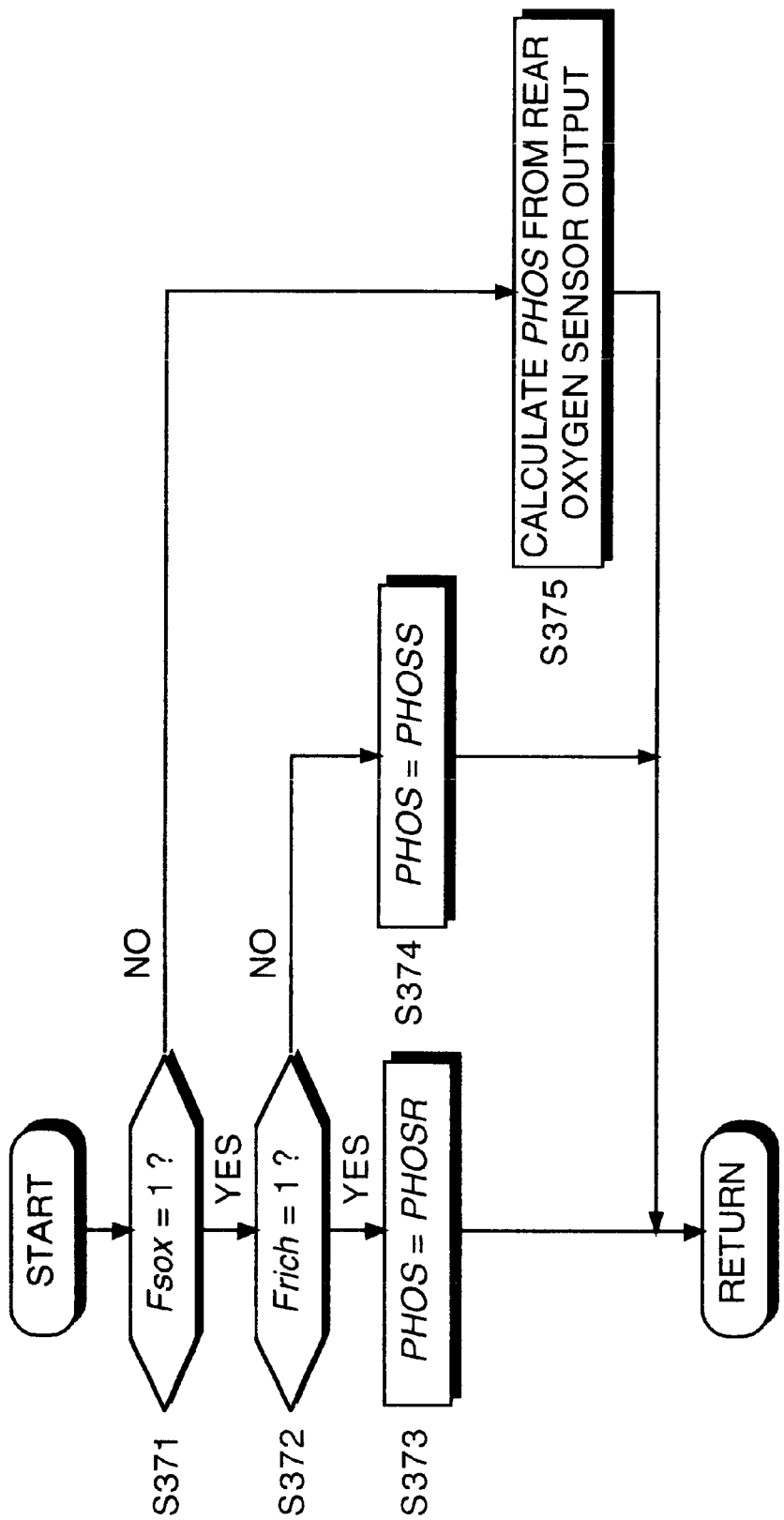
FIG. 7 is a flowchart describing a routine for setting an air-fuel ratio correction value PHOS performed by the controller.

FIG. 7 shows a routine for setting an air-fuel ratio correction value PHOS. This routine is performed by the controller 10 at an interval of, for example, 10 milliseconds. The essential feature of the routine is the setting of the correction value PHOS based on the sulfur oxide discharge flag Fsox and enriching flag Frich. The correction value PHOS is used for calculation of a proportional part in the calculation of an air-fuel ratio feedback correction coefficient α in air-fuel ratio feedback control. Therefore, instead of performing this routine at a fixed interval, it may be performed only when the proportional part of air-fuel ratio feedback control is calculated.

The proportional-integral control known in the art is applied to feedback correction of the air-fuel ratio. The correction value PHOS is a correction value for changing the magnitude of the proportional control part towards rich or the proportional control part towards lean in the feedback correction coefficient. When the correction value PHOS is positive, the rich proportional control part is set to a value larger than the lean proportional control part, and the control midpoint of air-fuel ratio feedback control, i.e., the mean oxygen concentration of the exhaust gas flowing into the catalytic converter 9, is shifted to rich. On the other hand, when the correction value PHOS is negative, the control midpoint is shifted to lean.

In this internal combustion engine 1, during normal running when the sulfur oxide discharge flag Fsox=0, when the conditions for discharging the sulfur oxides trapped by the catalyst are not satisfied, the correction value PHOS is calculated based on the output of the rear oxygen sensor 18, and air-fuel ratio feedback control is corrected by the correction value PHOS. This air-fuel ratio control method is known as air-fuel ratio feedback control of a dual sensor system. On the other hand, when the sulfur oxide discharge flag Fsox=1, the correction value PHOS is set according to the enriching flag Frich. The correction value PHOS is used for calculation of the air-fuel ratio feedback correction coefficient α.

First, in a step S371, the sulfur oxide discharge flag Fsox is determined, and when Fsox is 1, the routine proceeds to a step S372.

In the step S372, the enriching flag Frich is determined, and when Frich is 1, the routine proceeds to a step S373.

In the step S373, the correction value PHOS is set to a positive value PHOSR, and the routine is terminated.

On the other hand, when the enriching flag Frich is not 1 in the step 372, the routine proceeds to a step S374, the correction value PHOS is set to a negative value PHOSS, and the routine is terminated.

When Fsox is not 1 in the step S371, the routine proceeds to a step S375. This case corresponds to normal running of the internal combustion engine 1. Here, the correction value PHOS is set based on the oxygen concentration detected by the rear oxygen sensor 18 so that the mean air-fuel ratio coincides with the stoichiometric air-fuel ratio, and the routine is terminated.

Figure 8:
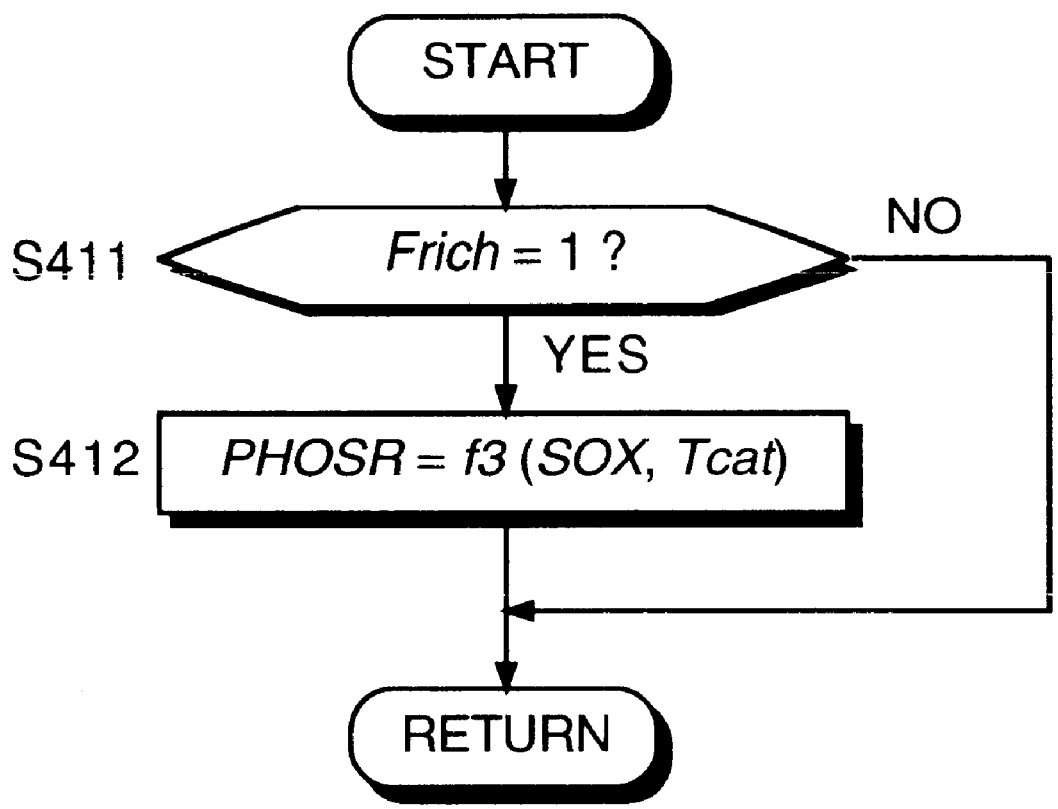
FIG. 8 is a flowchart describing a routine for calculating a positive correction value PHOSR performed by the controller.

The positive value PHOSR varies dynamically with the discharge amount of sulfur oxides due to the routine shown in FIG. 8. After the controller 10 calculates the PHOSR to apply, it is first stored in a RAM, and the PHOSR stored in the RAM is read out and used when the routine of FIG. 7 is executed.

However, it is also possible to use a single fixed value stored in the ROM of the controller 10 as the positive value PHOSR, or plural positive values PHOSR may be stored and used selectively according to the engine rotation speed N and load T. The negative value PHOSS is a single fixed value, or plural values are used selectively according to the engine rotation speed N and load T.

During normal running, this internal combustion engine 1 performs air-fuel ratio feedback control of the dual sensor system, and PHOS is calculated in the step S375 so that the oxygen concentration of the exhaust flowing into the catalytic converter 9 is a value corresponding to the stoichiometric air-fuel ratio. Therefore, the negative value PHOSS may be determined based on the average value of PHOS calculated in the step S375.

FIG. 8 shows the routine for calculating the positive value PHOSR. This routine is performed by the controller 10 at an interval of 10 milliseconds. The essential feature of this routine is that the positive value PHOSR applied to the correction value PHOS is varied according to the discharge amount of sulfur oxides.

First, in a step S411, it is determined whether or not the enriching flag Frich is 1. When Frich is 1, step S412 is performed, and when Frich is not 1, the routine is immediately terminated.

In a step S412, a function f3 having the sulfur oxide stored amount SOX and catalyst temperature Tcat as parameters, is determined. The function f3 specifies the relation between the positive value PHOSR and each parameter.

The positive value PHOSR is smaller the less the sulfur oxide stored amount, and when the sulfur oxide stored amount is 0, the positive value PHOSR is 0.

The positive value PHOSR is smaller the lower the catalyst temperature Tcat, and when the catalyst temperature Tcat is less than the sulfur oxide discharge temperature Tcat2, the positive value PHOSR is 0.

Figure 9:
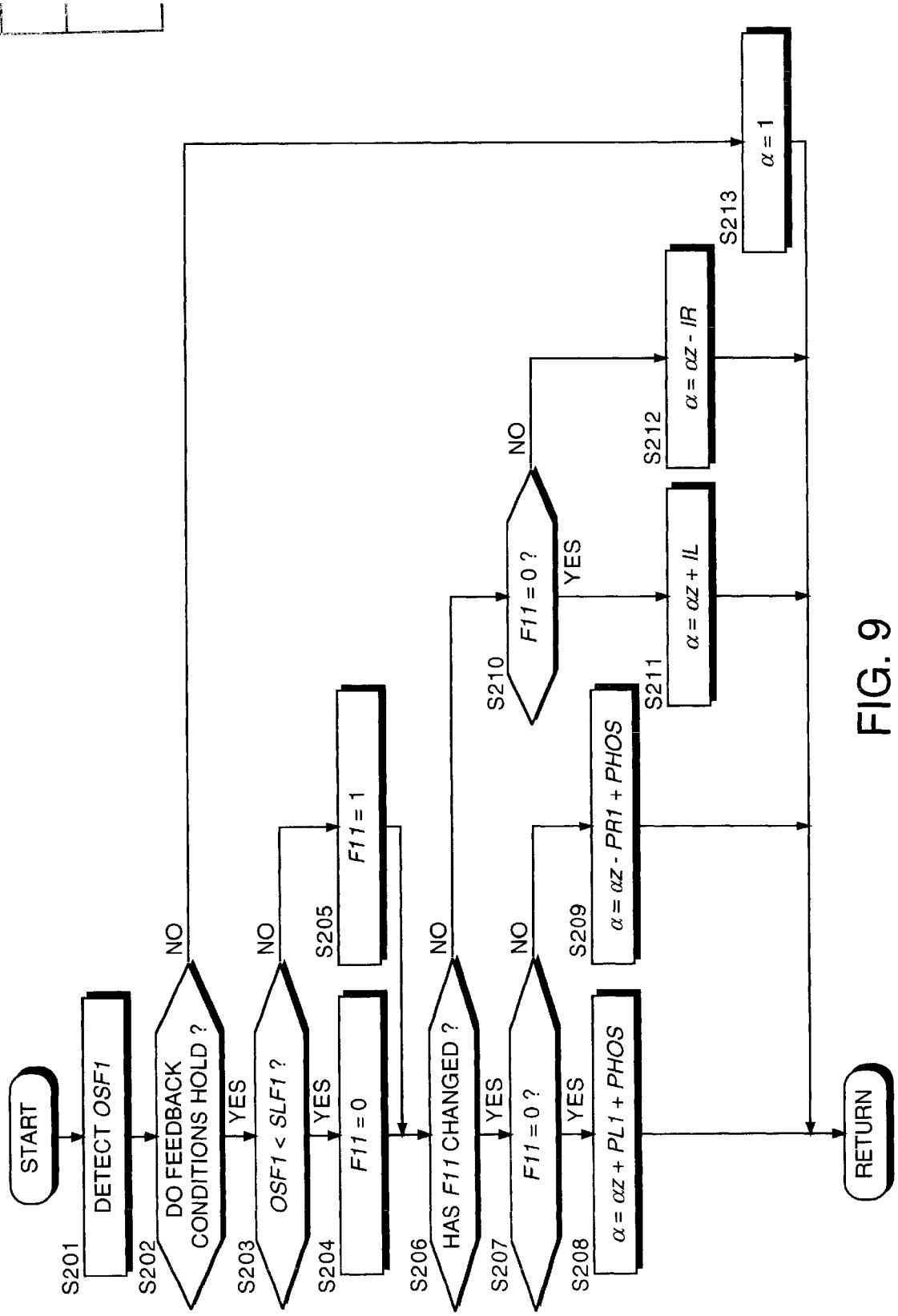
FIG. 9 is a flowchart describing a routine for calculating an air-fuel ratio feedback correction coefficient α performed by the controller.

FIG. 9 shows the routine for calculating the air-fuel ratio feedback correction coefficient α. This routine is performed by the controller 10 at an interval of 10 milliseconds. The essential feature of this routine is the determination of the air-fuel ratio feedback control coefficient α based on proportional-integral control. The air-fuel ratio feedback control coefficient α is used for calculation of the fuel injection amount of the fuel injector 6.

First, in a step S201, the output of the front oxygen sensor 17 is A/D converted, and an oxygen concentration signal OSF1 is found.

In a step S202, it is determined whether or not the air-fuel ratio feedback control conditions hold.

Air-fuel ratio feedback control conditions hold when all of the following conditions (1)–(3) are satisfied.

(1) The front oxygen sensor 17 is activated.

(2) Fuel increase controls immediately after engine start-up are completed. Specifically, it is considered that fuel increase controls immediately after engine start-up are completed when a fuel increase amount correction coefficient COEF which will be described later is 1.

(3) The target equivalence ratio TFBYA is 1. In other words, the target air-fuel ratio is the stoichiometric air-fuel ratio.

When air-fuel ratio feedback control conditions do not hold the air-fuel ratio feedback correction coefficient α is set to 1 in a step S213, and the routine is terminated.

When air-fuel ratio feedback control conditions hold, the oxygen concentration signal OSF1 is compared to a slice level SLF1 corresponding to the stoichiometric air-fuel ratio in a step S203.

When OSF1<SLF1, i.e., when the real air-fuel ratio is lean, an air-fuel ratio flag F11 is set to 0 which indicates lean in a step S204.

When OSF1≧SLF1, i.e., when the real air-fuel ratio is rich, the air-fuel ratio flag F11 is set to 1 which indicates rich in a step S205.

In a next step S206, it is determined whether or not the flag F11 has inverted. This determination is performed by determining whether or not the air-fuel ratio flag F11 set on the immediately preceding occasion the routine was executed, and the air-fuel ratio flag F11 set when this routine was executed, are equal. When the air-fuel ratio flag F11 has inverted, the routine proceeds to a step S207.

In the step S207, it is determined whether or not the air-fuel ratio flag F11=0, and when F11=0, the routine proceeds to a step S208.

In the step S208, the air-fuel ratio feedback correction coefficient α is calculated by adding a predetermined proportional part PL1 and the correction value PHOS to an immediately preceding value αz of the air-fuel ratio feedback correction coefficient α calculated on the immediately preceding occasion the routine was executed. The proportional part PL1 is a predetermined fixed value. The correction value PHOS is the value calculated in the step S375 of FIG. 7. After performing the step S208, the routine is terminated.

When the air-fuel ratio flag F11=1 in the step S207, i.e., when the real air-fuel ratio changes from lean to rich, the routine proceeds to a step S209.

In the step S209, the air-fuel ratio feedback correction coefficient α is calculated by subtracting a predetermined proportional part PR1 from the immediately preceding value αz of the air-fuel ratio feedback correction coefficient α calculated on the immediately preceding occasion the routine was executed, and adding the correction value PHOS. The proportional part PR1 is a predetermined fixed value. The correction value PHOS is a value calculated in the step S375 of FIG. 7. After performing the step S209, the routine is terminated.

When the air-fuel ratio flag F11 was not reversed in the step S206, the routine proceeds to a step S210.

In the step S210, it is determined whether or not the flag F11=0 and when F11=0, i.e., when it is determined that the real air-fuel ratio continues to be lean, the routine proceeds to a step S211.

In the step S211, the air-fuel ratio feedback correction coefficient α is calculated by adding a predetermined integral part IL to the immediately preceding value αz of the air-fuel ratio feedback correction coefficient α. The integral part IL is a predetermined fixed value. After performing the step S211, the routine is terminated.

When F11=0 in the step S210, i.e., when the real air-fuel ratio continues to be rich, the routine proceeds to a step S212.

In the step S212, the air-fuel ratio feedback correction coefficient α is calculated by subtracting the predetermined integral part IR from the immediately preceding value αz of the air-fuel ratio feedback correction coefficient α. The integral part IR is a predetermined fixed value. After performing the step S212, the routine is terminated.

Figure 10:
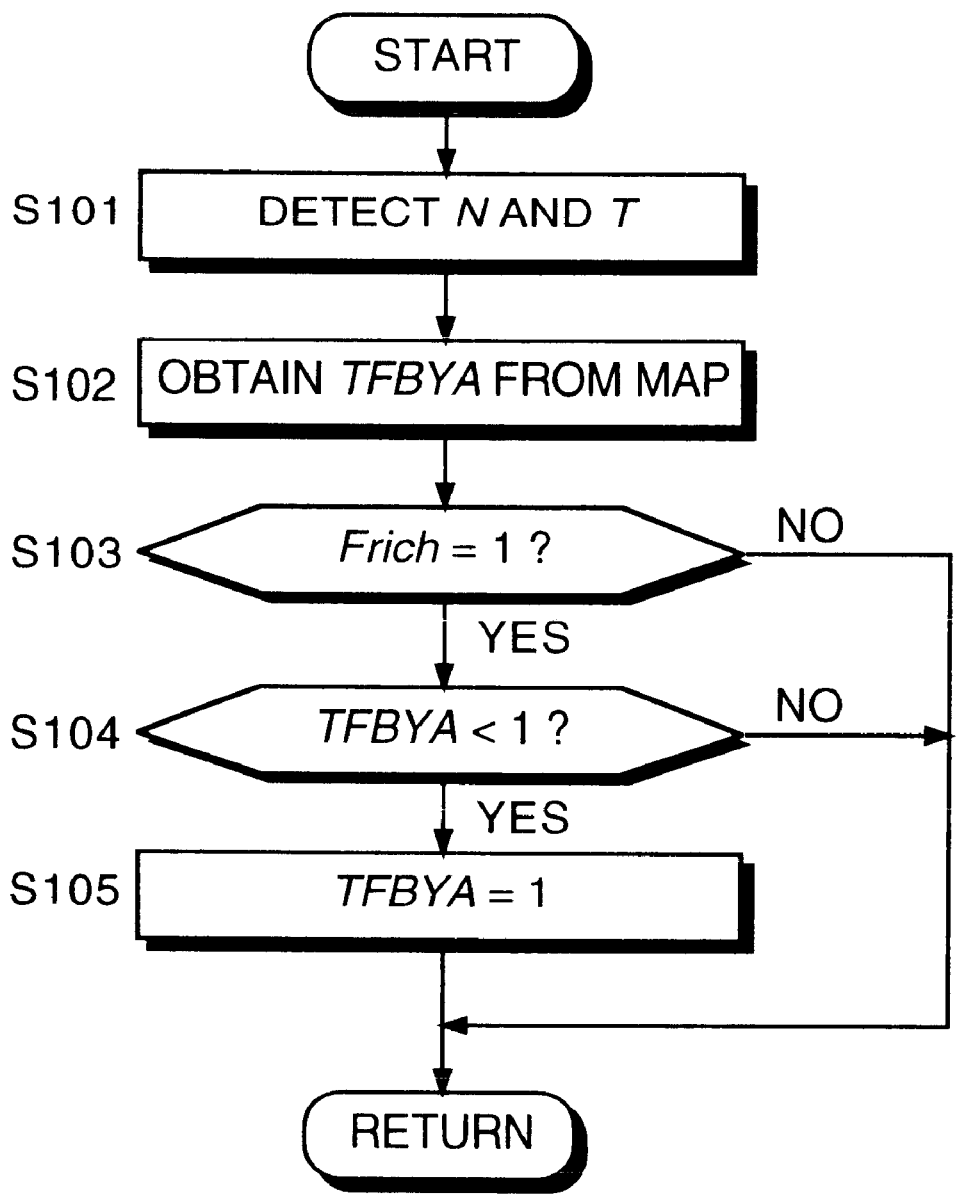
FIG. 10 is a flowchart describing a routine for setting a target equivalence ratio TFBYA performed by the controller.

FIG. 10 shows a routine for setting the target equivalence ratio TFBYA. This routine is performed by the controller 10 at an interval of 10 milliseconds. The essential feature of this routine is the determination of the target equivalence ratio TFBYA which represents the target air-fuel ratio according to the running conditions of the internal combustion engine 1. The determined target equivalence ratio TFBYA is used for calculating the fuel injection amount of the fuel injector 6, and for various other routines as a value representing the air-fuel ratio of the internal combustion engine 1.

First, in a step S101, as was described for the step S501 of FIG. 4, the engine rotation speed N and engine load T are calculated.

In a following step S102, a target equivalence ratio setting map stored in the controller 10 is looked up to calculate the target equivalence ratio TFBYA based on the engine rotation speed N and engine load T. Here, the target equivalence ratio=theoretical air-fuel ratio/target air-fuel ratio. TFBYA=1 means the stoichiometric air-fuel ratio, TFBYA>1 means a rich air-fuel ratio, and TFBYA<1 means a lean air-fuel ratio.

In the following step S103, it is determined whether or not the enriching flag Frich is 1. When Frich=1, the routine proceeds to a step S104. When Frich is not 1, the routine is terminated without proceeding to further steps.

In the step S104, it is determined whether or not the target equivalence ratio TFBYA is smaller than 1. When TFBYA<1, the routine proceeds to a step S105. When the target equivalence ratio TFBYA is not less than 1, the routine is terminated without proceeding to further steps.

In the step S105, the target equivalence ratio TFBYA is forcibly set to 1, and the routine is terminated. Due to this processing, when the enriching flag Frich is 1, even when the engine 1 is running in the lean air-fuel ratio running range, a lean air-fuel ratio is not applied. That is, once discharge control of sulfur oxides is started, lean running is not performed while discharge of sulfur oxides is possible, i.e., while the catalyst temperature Tcat is higher than the sulfur oxide discharge temperature Tcat2.

Figure 11:
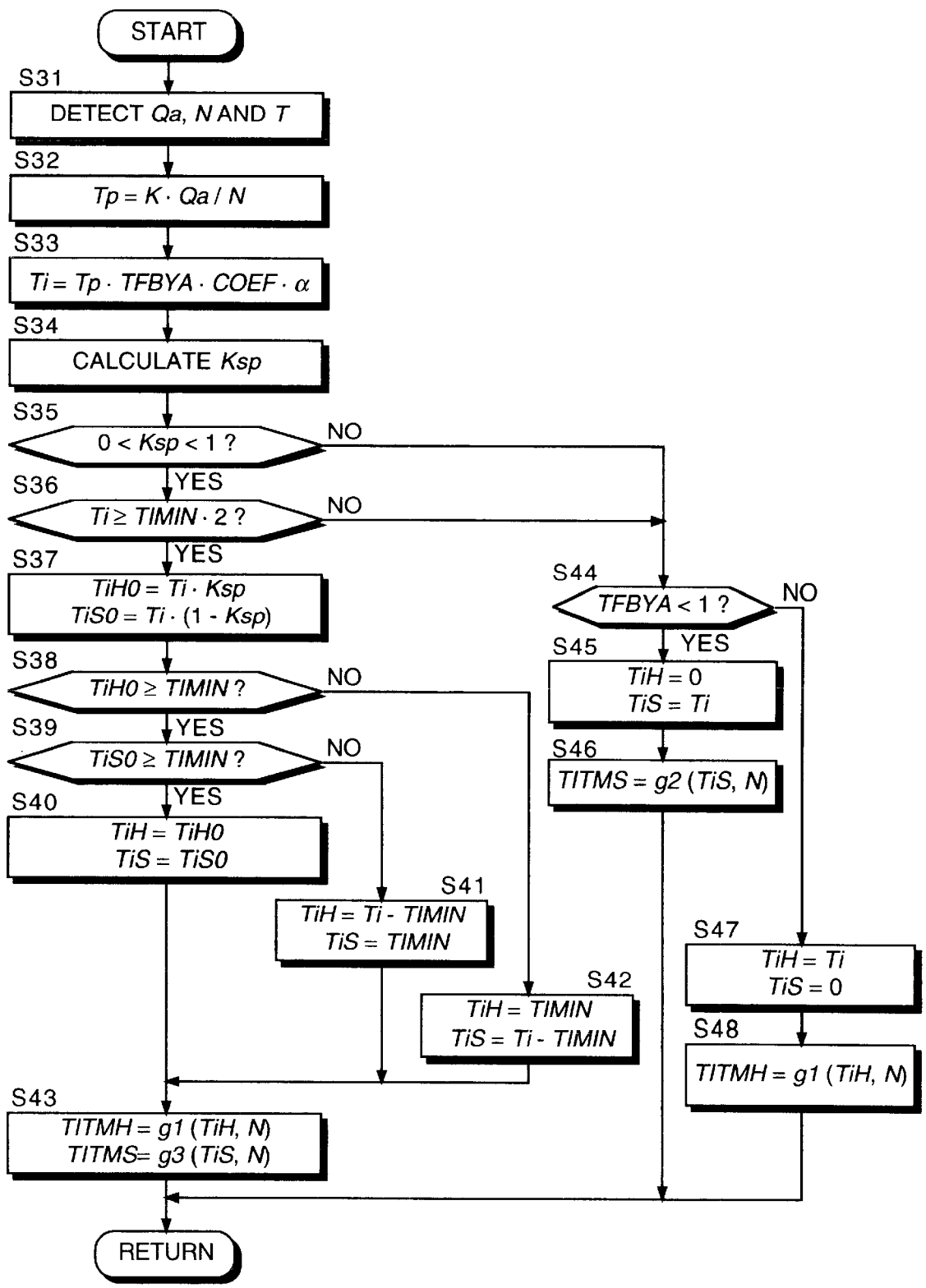
FIG. 11 is a flowchart describing a routine for calculating a fuel injection amount and an injection start timing performed by the controller.

FIG. 11 shows a routine for calculating a fuel injection amount Ti and fuel injection start timing TITM of the fuel injector 6. This routine is performed by the controller 10 at an interval of 10 milliseconds. The essential feature of this routine is the calculation of a fuel injection amount TiH and fuel injection start timing TITMH in the intake stroke, and fuel injection amount TiS and fuel injection start timing TITMS in the compression stroke. These fuel injection amounts are calculated as opening times of the fuel injector 6. These calculated values are stored in the memory of the controller 10, and applied to the fuel injection performed at a predetermined rotation angle of the internal combustion engine 1.

Specifically, in the fuel injection in the intake stroke, output of an injection pulse signal to the fuel injector 6 starts at a crank angle corresponding to the fuel injection start timing TITMH, and output of the injection pulse signal continues for a period obtained by adding an ineffectual injection amount Ts to the injection amount TiH. Likewise, in the fuel injection in the compression stroke, output of an injection pulse signal to the fuel injector 6 starts at a crank angle corresponding to the fuel injection start timing TITMS, and output of the injection pulse signal continues for a period obtained by adding the ineffectual injection amount Ts to the injection amount TiS. The ineffectual time Ts is a value for correcting a discrepancy between the output timing of the pulse signal, and the actual timing when actual valve opening of the fuel injector 6 starts.

Describing this routine, firstly in a step S31, the output signal of the air flow meter 12 is A/D converted and the intake air flowrate Qa of the internal combustion engine 1 is calculated. Also, the step engine rotation speed N and engine load T are calculated as was described for the step S501 of FIG. 4.

In a step S32, a basic fuel injection amount Tp equivalent to the stoichiometric air-fuel ratio is calculated by the following equation based on the intake air flowrate Qa and engine rotation speed N.

$$Tp = \frac{K \cdot Qa}{N}$$

where, K=constant.

In a step S33, the basic fuel injection amount Tp is corrected by the following equation to calculate the fuel injection amount Ti.

$$Ti = Tp \cdot TFBYA \cdot COEF \cdot \alpha$$

where, COEF=fuel increase amount correction coefficient,
TFBYA=target equivalence ratio, and
α=air-fuel ratio feedback correction coefficient.

The fuel increase amount correction coefficient COEF is the sum of various fuel increase amount control coefficients required immediately after the engine starts, such as a water temperature increase amount correction coefficient. After warmup of the engine is completed, COEF=1.

In a step S34, a dividing ratio Ksp is calculated. The fuel injection amount Ti may be divided into the fuel injection amount TiH in the intake stroke, and the fuel injection amount TiS in the compression stroke. The dividing ratio Ksp means the dividing ratio used for this purpose.

When the internal combustion engine 1 is run at the stoichiometric air-fuel ratio or a rich air-fuel ratio without performing catalyst temperature increasing control, uniform combustion which spreads a homogeneous air-fuel mixture through the whole combustion chamber 3, is performed. For this purpose, in the running region where TFBYA≧1, all of the fuel injection amount is injected in the intake stroke. Therefore, in this region, Ksp is set to 1.

When running at a lean air-fuel ratio, an air-fuel layer having the stoichiometric air-fuel ratio is formed surrounding the spark plug 7 of the combustion chamber 3 whereas only air is present outside the air-fuel layer, so stratified combustion is performed. In other words, in the running region where TFBYA<1, all of the fuel injection amount is injected in the compression stroke. Therefore, in this region, Ksp is set to 0.

However, when conditions are satisfied for increasing the temperature of the catalyst i.e., when the temperature increase flag Fheat=1, priority is given over the above setting based on the running region, and fuel injection control to increase catalyst temperature is performed.

Specifically, the fuel injection amount in the intake stroke is determined so that the air-fuel ratio of the air-fuel mixture of the whole combustion chamber 3 is lean and is an air-fuel ratio at which flame propagation is possible. On the other hand, the fuel injection amount in the compression stroke, fuel injection start timing and ignition timing of the spark plug 7 are determined so that the air-fuel ratio of the air-fuel mixture around the spark plug 7 is rich when ignition is performed, and the air-fuel layer around the spark plug 7 is atomized to a state at which ignition is possible.

For this reason, when the temperature increase flag Fheat=1, the value of the dividing ratio Ksp is calculated in the range 0<Ksp<1.

However, when there is a change-over of the type of combustion, it may be accompanied by a sudden change of output, so Ksp is varied gradually.

Next, the method of determining the dividing ratio Ksp will be described.

The fuel injection amount TiH in the intake stroke is intended to form an air-fuel mixture having an air-fuel ratio leaner than the stoichiometric air-fuel ratio and in the range 16–28 at which flame propagation is possible throughout the whole of the combustion chamber 3. Specifically, 50–90% of the fuel injection amount Ti is equivalent to this. Therefore, Ksp is set to 0.5–0.9.

The remainder obtained by subtracting the fuel injection amount TiH from the fuel injection amount Ti is the fuel injection amount TiS in the compression stroke. If ignition is performed before the fuel injected in the compression stroke diffuses through the whole of the combustion chamber 3, the air-fuel ratio of the air-fuel layer in a region where the fuel injected in the compression stroke overlaps with the air-fuel mixture formed previously will certainly be richer than the stoichiometric air-fuel ratio. Further, the richness of this rich air-fuel layer may be varied depending on how much the injected fuel is diffused, i.e., depending on how long the time is from fuel injection in the compression stroke to ignition.

Therefore, by adjusting the ignition timing, the air-fuel ratio of the rich air-fuel layer can be adjusted to be within the range 9–13 which is richer than the stoichiometric air-fuel ratio and which permits ignition to be performed. To adjust the air-fuel ratio of the rich air-fuel layer so that it lies in this region, when the injection amount in the compression stroke is small, ignition is performed before the injected fuel diffuses over a wide area of the combustion chamber. On the other hand, when the injection amount in the compression stroke is large, ignition is performed after the injected fuel has diffused over a wide area.

However, the time from fuel injection to ignition has the following limitation. The rich air-fuel layer must be sufficiently atomized to obtain good ignition, so the lower limit of time from fuel injection to ignition is determined by the time required for atomization. Also, if a piston cavity is formed to a shape in which the injected fuel is concentrated, the fuel injection timing cannot be advanced further than a certain timing. The upper limit of the time from fuel injection to ignition is determined by this advance angle amount.

Taking the above limitations into consideration, a setting of Ksp which largely decreases or increases the injection amount in the compression stroke must be avoided. Therefore, the dividing ratio Ksp is set according to the fuel injection amount Ti so that a rich air-fuel layer of air-fuel ratio 9–13 can be obtained within the above limits of ignition timing.

After setting the dividing ratio in this way in the step S34, the routine proceeds to a step S35. Here, it is determined whether or not conditions are satisfied for performing two injections in the intake stroke and the compression stroke by determining whether or not the dividing ratio Ksp is in the range 0<Ksp<1. When conditions are satisfied for increasing the catalyst temperature, or when the type of combustion is being changed over, the value of Ksp lies within the range 0<Ksp<1.

When 0<Ksp<1 in a step S35, it is determined in a step S36 whether or not it is possible to perform injection twice by determining whether or not Ti≦2·TIMIN is satisfied. TIMIN is the minimum injection amount for which the fuel injector 6 can perform fuel injection with linear characteristics relative to the injection pulse signal, and in order to precisely inject fuel respectively in the intake stroke and the compression stroke, the total fuel injection amount Ti must be at least twice the minimum injection amount TIMIN.

When Ti≦2·TIMIN is satisfied in the step S36, the routine proceeds to a step S37.

In the step S37, a temporary fuel injection amount TiHO in the intake stroke and a temporary fuel injection amount TiSO in the compression stroke are calculated by the following equations.

$$TiHO=Ti \cdot Ksp$$

$$TiSO=Ti \cdot (1-Ksp)$$

In the following step S38, the temporary injection amounts TiHO and TiSO are compared with the minimum injection amount TIMIN.

If the temporary injection amounts TiHO and TiSO are both more than the minimum injection amount TIMIN, the fuel injection amount in the intake stroke TiH is set equal to TiHO and the fuel injection amount in the compression stroke TiS is set equal to TiSO in a step S40.

On the other hand, when one of the temporary injection amounts TiHO, TiSO is less than TIMIN, they are corrected so as not to be less than TIMIN. That is, if TiSO<TIMIN, TiH=Ti−TIMIN and TiS=TIMIN are set in a step S41. If TiHO<TIMIN, TiH=TIMIN and TiS=Ti−TIMIN are set in a step S42.

After setting the injection amount in the intake stroke TiH and the injection amount in the compression stroke TiS in this way, the routine proceeds to a final step S43, and an intake stroke fuel injection start timing TITMH is calculated using a function g1 which has the injection amount TiH and engine rotation speed N as parameters. A compression stroke fuel injection start timing TITMS is also calculated using a function g3 which has the injection amount TiS and engine rotation speed N as parameters.

The function g1 gives the injection timing, according to the injection amount TiH in the intake stroke and engine rotation speed N, at which fuel injected in the intake stroke diffuses through the whole of the combustion chamber 3. The function g3 gives the injection timing in the compression stroke, according to the injection amount TiS in the compression stroke and engine rotation speed N, at which the injected fuel can form a rich air-fuel layer at a predetermined air-fuel ratio surrounding the spark plug 7 when the injected fuel is completely atomized at the ignition timing. The fuel injection timings are determined assuming that the ignition timing is the optimum fuel cost-performance point or the knock critical point. The routine is terminated by executing this step S43.

When 0<Ksp<1 is not satisfied in the step S35, injection is not performed twice. Also, when Ti≦2·TIMIN is not satisfied in the step S36, it is impossible to perform injection twice. In either of these cases, the routine proceeds to a step S44.

In the step S44, it is determined whether or not TFBYA<1 is satisfied.

When TFBYA<1, it means that conditions are satisfied for running at the lean air-fuel ratio. In this case, the routine proceeds to a step S45.

In the step S45, the whole amount of the fuel injection amount Ti calculated in the step S33 is set as the fuel injection amount TiS in the compression stroke, and the injection amount TiH in the intake stroke is set to 0. In the following step S46, the start timing TITMS of the compression stroke fuel injection is calculated using a function g2 based on the compression stroke injection amount TiS and engine rotation speed N, and the routine is terminated.

The function g2 gives the injection timing in the compression stroke, according to the injection amount TiS and engine rotation speed N, at which injected fuel can form an air-fuel layer effectively having the stoichiometric air-fuel ratio surrounding the spark plug 7 at the ignition timing.

When TFBYA<1 is not satisfied in the step S44, it means that conditions are not satisfied for running at a lean air-fuel ratio. In this case, the routine proceeds to a step S47.

In the S47, the whole of the fuel injection amount Ti calculated in the step S33 is set as the fuel injection amount TiH in the intake stroke, and the injection amount TiS in the compression stroke is set to 0. In the following step S48, the start timing TI MH of intake stroke fuel injection is calculated using the function g1 based on the calculated intake stroke injection amount TiH and engine rotation speed N, and the routine is terminated. The function g1 is the same as that which was used in the step S43.

In this internal combustion engine 1, fuel injection in the intake stroke and fuel injection in the compression stroke is performed by the same fuel injector 6. However, to perform fuel injection in the intake stroke, a separate fuel injector which injects fuel into an intake port of the internal combustion engine 1 may also be provided. Further, when an auxiliary fuel injector for assuring the startability of the engine at very low temperature is provided to the collector 20, the fuel injection of the intake stroke may be provided using the auxiliary fuel injector.

Figure 12:
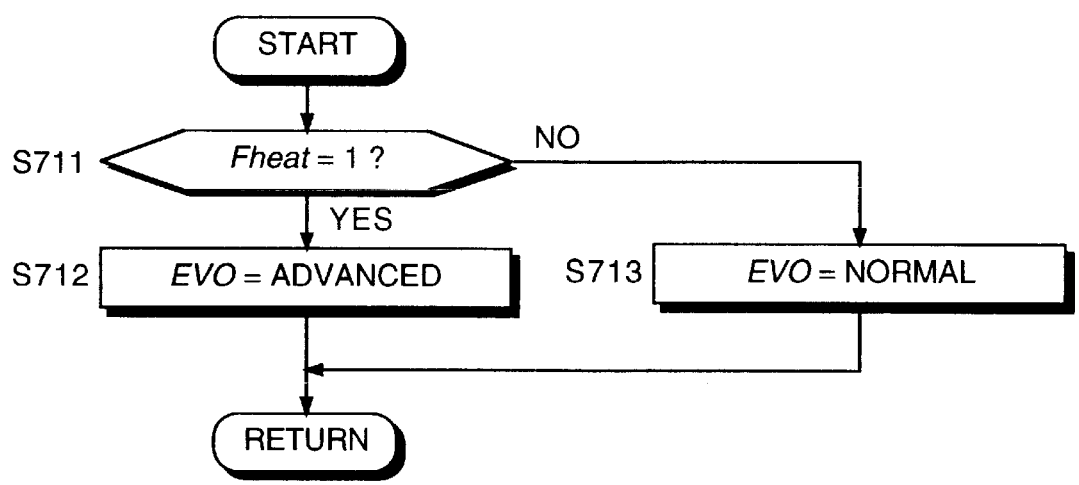
FIG. 12 is a flowchart describing a routine for setting an exhaust valve opening timing EVO performed by the controller.

FIG. 12 shows the routine for setting the valve opening timing EVO of the exhaust valve 22. This routine is performed by the controller at an interval of 10 milliseconds. The essential feature of the routine is the setting of the valve opening timing EVO of the exhaust valve 22 based on the temperature increase flag Fheat. The controller 10 outputs a drive signal to the variable valve mechanism 23 so that the exhaust valve 22 opens with the valve opening timing EVO set by this routine.

Figure 15:
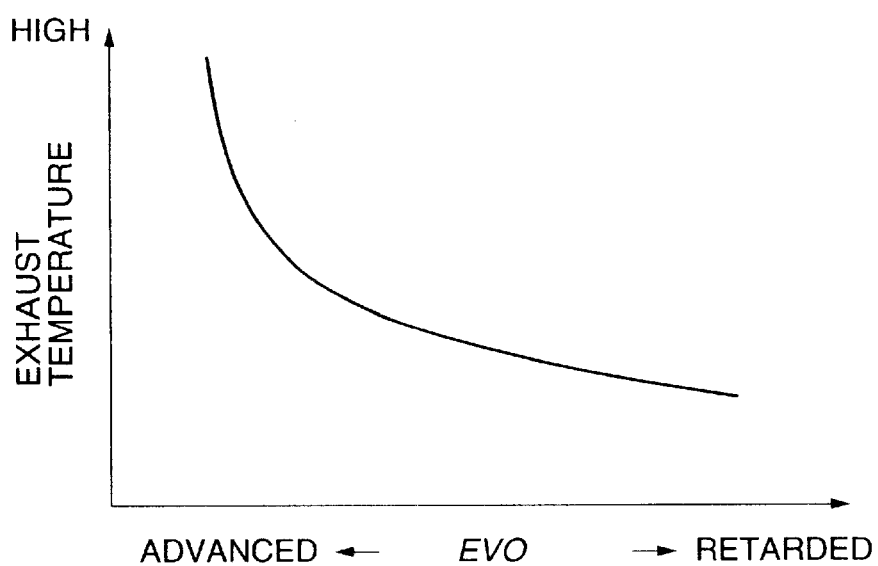
FIG. 15 is a diagram describing the relation of the exhaust valve opening timing EVO and exhaust gas temperature.

First, in a step S711, it is determined whether or not the temperature increase flag Fheat is 1, i.e., whether or not the conditions for increasing the catalyst temperature are satisfied. When Fheat=1, in a step S712, the valve opening timing EVO of the exhaust valve 22 is advanced beyond its usual value. When the valve opening timing EVO of the exhaust valve 22 is advanced, burnt gas flows into the exhaust passage 8 in the last stage of the power stroke, so the exhaust gas temperature rises and the catalyst temperature in the catalytic converter 9 also rises, as shown in FIG. 15. On the other hand, when the temperature increase flag Fheat is not 1, the routine proceeds to a step S713. Here, the valve opening timing EVO of the exhaust valve 22 is set to its usual value.

Next, referring to FIGS. 13A–13G, a description will be given of how discharge control of sulfur oxides is performed when the above routine is applied.

In order to simplify the description, it will be assumed that running conditions are always in the region A of FIG. 14.

Figure 13:
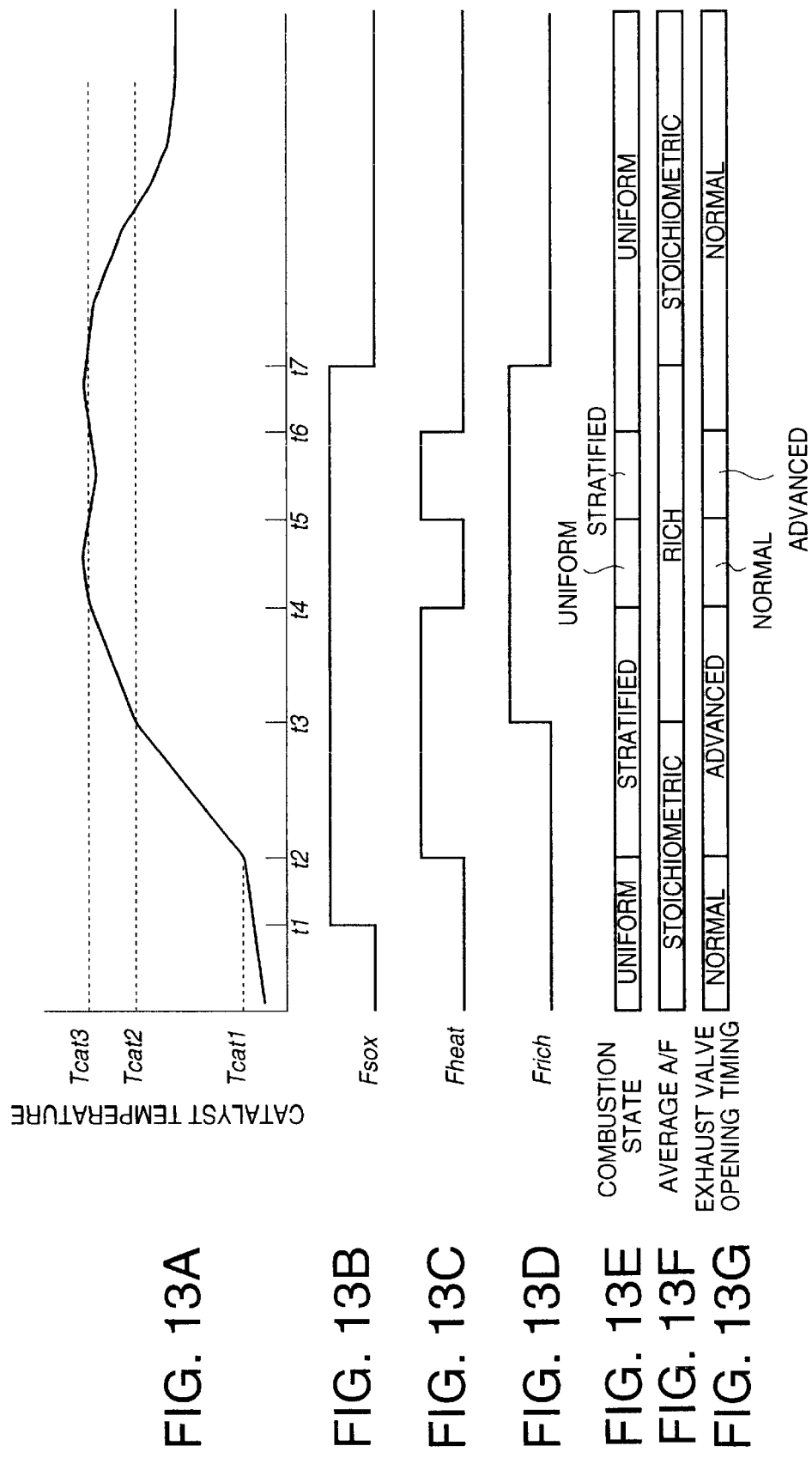
FIGS. 13A–13G are tiling charts describing control of sulfur oxide discharge by a catalyst performed by the controller.

First, the sulfur oxide stored amount SOx of the catalyst exceeds the upper limiting value SOXmax at a time t1, and the sulfur oxide discharge condition determining routine of FIG. 4 sets the discharge flag Fsox to 1, as shown in FIG. 13B.

However, from the time t1 to a time t2, the catalyst temperature Tcat is lower than the predetermined temperature Tcat1, and as the temperature increase condition determining routine of FIG. 5 determines that conditions for increasing the temperature of the catalyst are not satisfied, the temperature increase flag Fheat is still 0 as shown in FIG. 13C. Therefore, from the time t1 to the time t2, normal engine control is performed. Under normal engine control, uniform combustion in which an air-fuel mixture at the stoichiometric air-fuel ratio diffuses through the whole of the combustion chamber 3, or stratified lean combustion, in which an air-fuel layer at the stoichiometric air-fuel ratio surrounds the spark plug 7 and only air surrounds this layer, is performed according to the running region as shown in FIG. 14. Here, it is assumed that running conditions are in the region A, so uniform combustion at the stoichiometric air-fuel ratio is performed as shown in FIG. 13E and FIG. 13F.

When the time t2 is reached, the catalyst temperature Tcat is above a predetermined temperature Tcat1. Consequently, the temperature increase condition determining routine of FIG. 5 determines that the conditions are satisfied for increasing the temperature of the catalyst, and the temperature increase flag Fheat is set to 1, as shown in FIG. 13C.

As a result, up to a time t3, the routine for calculating fuel injection amount and fuel injection start timing of FIG. 11 performs stratified combustion for increasing the catalyst temperature by using both fuel injection in the intake stroke and fuel injection in the compression stroke. In this stage however, if the catalyst temperature Tcat is equal to or less than a predetermined temperature Tcat2, temperature conditions are satisfied for the catalyst to absorb sulfur oxides, so the enriching flag Frich is set to 0 as shown in FIG. 13D. Therefore, the routine for setting the air-fuel ratio correction value PHOS of FIG. 7 sets PHOS to the negative value PHOSS, and the fuel ratio in the whole of the combustion chamber 3 is maintained at the stoichiometric air-fuel ratio.

Due to this combustion, carbon monoxide produced from the rich air-fuel layer around the spark plug 7 reacts with oxygen remaining in the lean air-fuel layer in the combustion chamber 3, exhaust passage 8 or catalytic converter 9 after the main combustion, and the temperature of the catalyst rises.

The oxygen concentration of the exhaust flowing into the catalytic converter 9 corresponds to the stoichiometric air-fuel ratio, so the reaction between carbon monoxide and oxygen takes place most efficiently, and the maximum temperature increase effect is obtained.

At this time, the routine for setting the valve opening timing EVO of the exhaust valve 22 of FIG. 12 advances the valve opening timing EVO of the exhaust valve 22, as shown in FIG. 13G. Therefore, the exhaust temperature rises further which assists temperature increase of the catalyst. In practice, the dividing ratio Ksp is gradually varied from the time t2 and the type of combustion is gradually varied from stratified combustion at the stoichiometric air-fuel ratio to stratified combustion at a rich air-fuel ratio, but this timing chart does not show change-over to other types of combustion or slowly varying parts.

When the catalyst temperature Tcat exceeds the predetermined temperature Tcat2 at the time t3, the enriching flag Frich changes to 1 as shown in FIG. 13D. As a result, the routine for setting the air-fuel ratio correction value PHOS of FIG. 7 sets the correction value PHOS to the positive value PHOSR, and stratified combustion is then performed at a rich air fuel ratio. Therefore, the oxygen concentration of the exhaust flowing into the catalytic converter 9 corresponds to a rich air-fuel ratio, discharge of sulfur oxides from the catalyst is promoted. Advance angle operation of the valve opening timing EVO of the exhaust valve 22 continues in this situation.

Due to this rich shift of the air-fuel ratio, the amount of oxygen remaining after the main combustion decreases, and there is thus a possibility that the catalyst temperature increase effect may also slightly decrease. However, the catalyst temperature Tcat has already reached the sulfur oxide discharge temperature Tcat2, so there is no effect on sulfur oxide discharge from the catalyst. On the contrary, decreasing the temperature increase makes the increase of catalyst temperature smoother, and has a desirable effect on the durability of the catalyst. The advance angle operation of the valve timing EVO of the exhaust valve 22 is subsequently performed even after the time t3 has elapsed. When a time t4 is reached, the catalyst temperature Tcat reaches the allowable maximum temperature Tcat3. As a result, the temperature increase condition determining routine of FIG. 5 resets the temperature increase flag Fheat to 0. As the running conditions are in the region A as described above, when the temperature increase flag Fheat reaches 0, the fuel injection amount and fuel injection start timing calculation routine of FIG. 11 performs uniform combustion by injecting all of the fuel injection amount Ti in the intake stroke. Due to this, the increase in the catalyst temperature Tcat is suppressed, and the durability of the catalyst is not impaired. Also, as the temperature increase flag Fheat is 0, the routine for setting the valve opening timing EVO of the exhaust valve 22 of FIG. 12 returns the valve opening timing TVO to the normal state.

On the other hand, the correction value PHOS is set to the positive value PHOSR, so the air-fuel ratio throughout the combustion chamber 3 is maintained at a rich air-fuel ratio. Consequently, the oxygen concentration of the exhaust flowing into the catalytic converter 9 continues to correspond to a rich air-fuel ratio.

At a time t5, the catalyst temperature Tcat again falls to or below the allowable maximum temperature Tcat3, so the temperature increase flag Fheat again becomes 1, and up to a time t6, the same stratified combustion is performed as during the interval from the time t3 to the time t4, and the valve opening timing EVO of the exhaust valve 22 is also advanced.

At the time t6, due to the increase of the catalyst temperature Tcat, up to a time t7, the same uniform combustion at a rich-air fuel ratio is performed as during the interval from the time t4 to the time t5.

When the sulfur oxide stored amount SOX falls below the lower limiting value SOXmin at the time t7, the sulfur oxide discharge condition determining routine of FIG. 4 resets the sulfur oxide discharge flag Fsox to 0 as shown in FIG. 13B. As a result, the enriching flag Frich and the temperature increase flag Fheat are also reset to 0. Hence, until the sulfur oxide stored amount SOX again exceeds the upper limiting value SOXmax, uniform combustion is subsequently performed at the stoichiometric air fuel ratio in the region A.

Next, a second embodiment of this invention will be described referring to FIGS. 16 and 17.

According to this embodiment, a different sulfur oxide discharge condition determining routine and PHOSR setting routine to those of the first embodiment are used. The remaining features of the construction are identical to those of the first embodiment.

Figure 16:
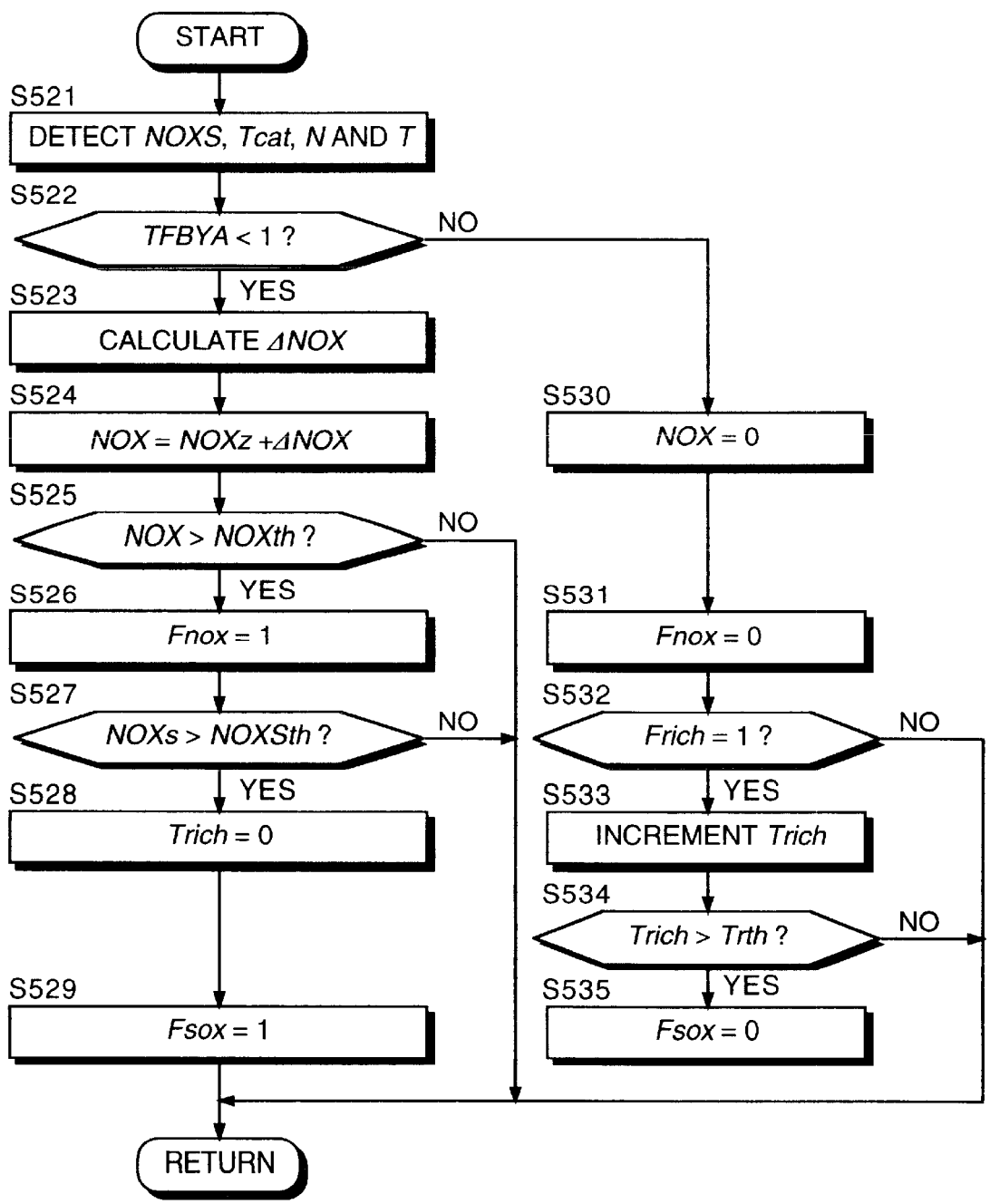
FIG. 16 is similar to FIG. 4, but showing a second embodiment of this invention.

FIG. 16 shows the sulfur oxide discharge condition determining routine. This routine is performed by the controller 10 at an interval of 10 milliseconds. The essential feature of the routine is that the sulfur oxide storing state of the catalyst is determined and the discharge flag Fsox is set based on the nitrogen oxide concentration of the exhaust flowing out from the catalytic converter.

In a step S521, the engine rotation speed N, catalyst temperature Tcat and engine load T are found in the same way as in the step S501 of FIG. 4. Further, the output signal of the NOx sensor 19 is A/D converted to calculate a nitrogen oxide concentration NOXS.

In a step S522, it is determined whether or not the target equivalence ratio TFBYA is less than 1, i.e., whether or not the internal combustion engine 1 is running at a lean air-fuel ratio. When the target equivalence ratio TFBYA is less than 1, the routine proceeds to a step S523.

In the step S523, a nitrogen oxide amount delta NOX trapped by the catalyst in the routine execution interval of 10 milliseconds is calculated from the following equation.

$$\Delta \text{NOX} = (\text{nitrogen oxide amount flowing into catalytic converter in 10 milliseconds}) \cdot (\text{nitrogen oxide trapping rate of catalyst})$$

The nitrogen oxide amount flowing into the catalytic converter 9 in 10 milliseconds is calculated from the engine rotation speed N, engine load T and mean air-fuel ratio as parameters. The target equivalent ratio TFBYA may be used as the mean air-fuel ratio.

The nitrogen oxide trapping rate of the catalyst corresponds to the nitrogen oxide amount trapped in unit time/the nitrogen oxide amount flowing in unit time. This is calculated from a nitrogen oxide stored amount NOXz calculated on the immediately preceding occasion when the routine was executed, the catalyst temperature Tcat and the mean air-fuel ratio as parameters.

The nitrogen oxide trapping rate of the catalyst takes a value between 0 and 1, and it has the following characteristics relative to various parameters.

The nitrogen oxide trapping rate is larger the smaller the nitrogen oxide stored amount, and is a maximum when the nitrogen oxide stored amount is 0.

The nitrogen oxide trapping rate is a maximum when the catalyst temperature Tcat is a predetermined temperature, and decreases as the catalyst temperature Tcat falls below this temperature. When the catalyst temperature Tcat is equal to or less than the catalyst activation temperature, the nitrogen oxide trapping rate is 0.

The nitrogen oxide trapping rate decreases as the mean air-fuel ratio becomes less lean, and it is 0 at a rich air-fuel ratio.

In a next step S524, $\Delta NOX$ is added to the nitrogen oxide stored amount NOXz calculated on the immediately preceding occasion when the routine was executed to give the latest nitrogen oxide stored amount NOX.

$$NOX = NOXz + \Delta NOX$$

In a next step S525, it is determined whether or not the nitrogen oxide stored amount NOX is larger than a predetermined amount NOXth. The to predetermined amount NOXth is set to a maximum NOx amount that can be stored or to a slightly lower value. When NOX>NOXth, the routine proceeds to a step S526. In the step S526, a flag Fnox is set to 1 showing that t=conditions for discharging nitrogen oxides trapped by the catalyst are satisfied. When Fnox has become 1, rich control is temporarily performed. It should however be noted that control by this flag Fnox is not directly related to discharge of sulfur oxides which is the essential feature of this invention. Also, the flag Fnox is only set in the step S526, and actual rich control based on the flag Fnox is performed by a rich spike control routine separate from this routine.

In a next step S527, it is determined whether or not the nitrogen oxide concentration NOXS is greater than an upper limiting value NOXSth. The nitrogen oxide trapping rate of the catalyst i.e., the nitrogen oxide amount which can be trapped in unit time, decreases the more the sum of the nitrogen oxides and sulfur oxides trapped, increases. When the nitrogen oxide trapping rate falls, the nitrogen oxide amount flowing out of the catalytic converter 9 increases.

Therefore, when the amount of sulfur oxides corresponding to the upper limiting value SOXmax of the first embodiment and the predetermined amount NOXth of nitrogen oxides are trapped by the catalyst, the nitrogen oxide concentration corresponding to the nitrogen oxide amount flowing out of the catalytic converter 9 is set as the upper limiting value NOXSth. Due to this setting, by comparing the nitrogen oxide concentration NOXth which is actually detected with the upper limiting value NOXSth, it can be determined whether or not sulfur oxides higher than the upper limiting value SOXmax have been trapped.

When NOXS>NOXSth in the step S527, the routine proceeds to a step S528. In the step S528, a counter value Trich which measures the elapsed time from when air-fuel ratio rich conditions were satisfied, is reset to 0.

In a next step S529, the sulfur oxide discharge flag Fsox is set to 1 and the routine is terminated.

If on the other hand the target equivalence ratio TFBYA is greater than 1 in the step S522, the routine proceeds to a step S530.

In the step S530, the nitrogen oxide stored amount NOX is set to 0. This is because the nitrogen oxides trapped by the catalyst are rapidly discharged at the stoichiometric air-fuel ratio or a rich air-fuel ratio.

In a next step S531, the flag Fnox is reset to 0.

In a next step S532, it is determined whether or not the enriching flag Frich is 1. When the enriching flag is 1, the routine proceeds to a step S533.

In the step S533, the counter value Trich is incremented.

In a following step S534, it is determined whether or not the counter value Trich is greater than a predetermined value Trth. When Trich>Trth, the routine proceeds to a step S535.

In the step S535, the sulfur oxide discharge flag Fsox is reset to 0 and the routine is terminated. If Trich>Trth, it means that the internal combustion engine 1 was being run at a rich air-fuel ratio for a predetermined time, and as a result, it is determined that discharge of sulfur oxides from the catalyst is complete.

Hence, according to this embodiment, the storing state of sulfur oxides by the catalyst can be determined by the nitrogen oxide concentration NOXS downstream of the catalytic converter 9.

By omitting the step S523 and setting the $\Delta NOX$ of the step S524 to a fixed value, calculation of the nitrogen oxide stored amount NOX can be simplified.

Figure 17:
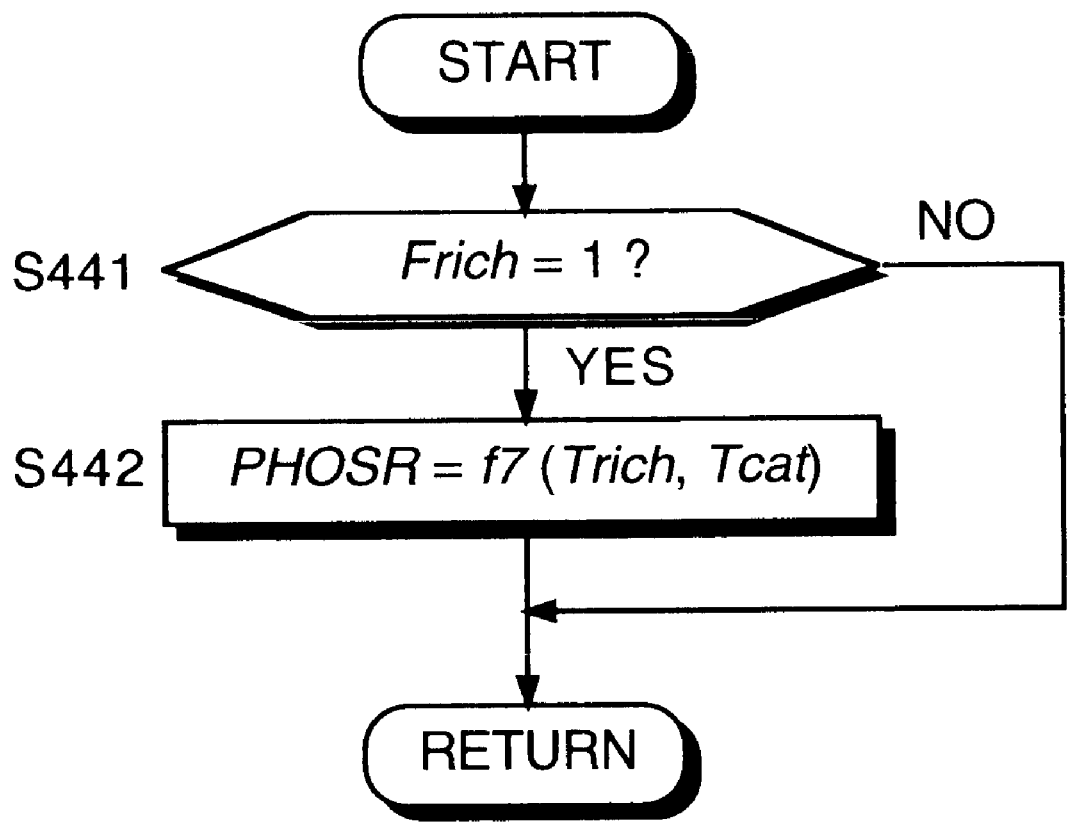
FIG. 17 is similar to FIG. 8, but showing the second embodiment of this invention.

FIG. 17 shows the routine for setting the positive value PH OSR applied to the air-fuel ratio correction value PHOS. This routine is executed instead of the routine of FIG. 8 of the first embodiment, and is performed by the controller 10 at an interval of 10 milliseconds as in the case of the routine of FIG. 8.

In a step S441, is determined whether or not the enriching flag Frich is 1. Only when Frich is 1, the routine proceeds to a step S442, and in other cases the routine is terminated without performing any processing.

In the step S442, the positive value PHOSR is calculated using a function f7 having the counter value Trich and catalyst temperature Tcat as parameters. Here, the function f7 specifies the relation between the positive value PHOSR and the parameters as follows.

The positive value PHOSR decreases, the larger the counter value Trich corresponding to the elapsed time from when the enriching flag Frich was set to 1, and when the counter value Trich becomes equal to the predetermined value Trth, the positive value PHOSR is 0.

The positive value PHOSR decreases the lower the catalyst temperature Tcat, and when the catalyst temperature Tcat is equal to or less than the sulfur oxide discharge temperature Tcat2, the positive value PHOSR is 0.

A third embodiment of this invention will now be described referring to FIG. 18.

Figure 18:
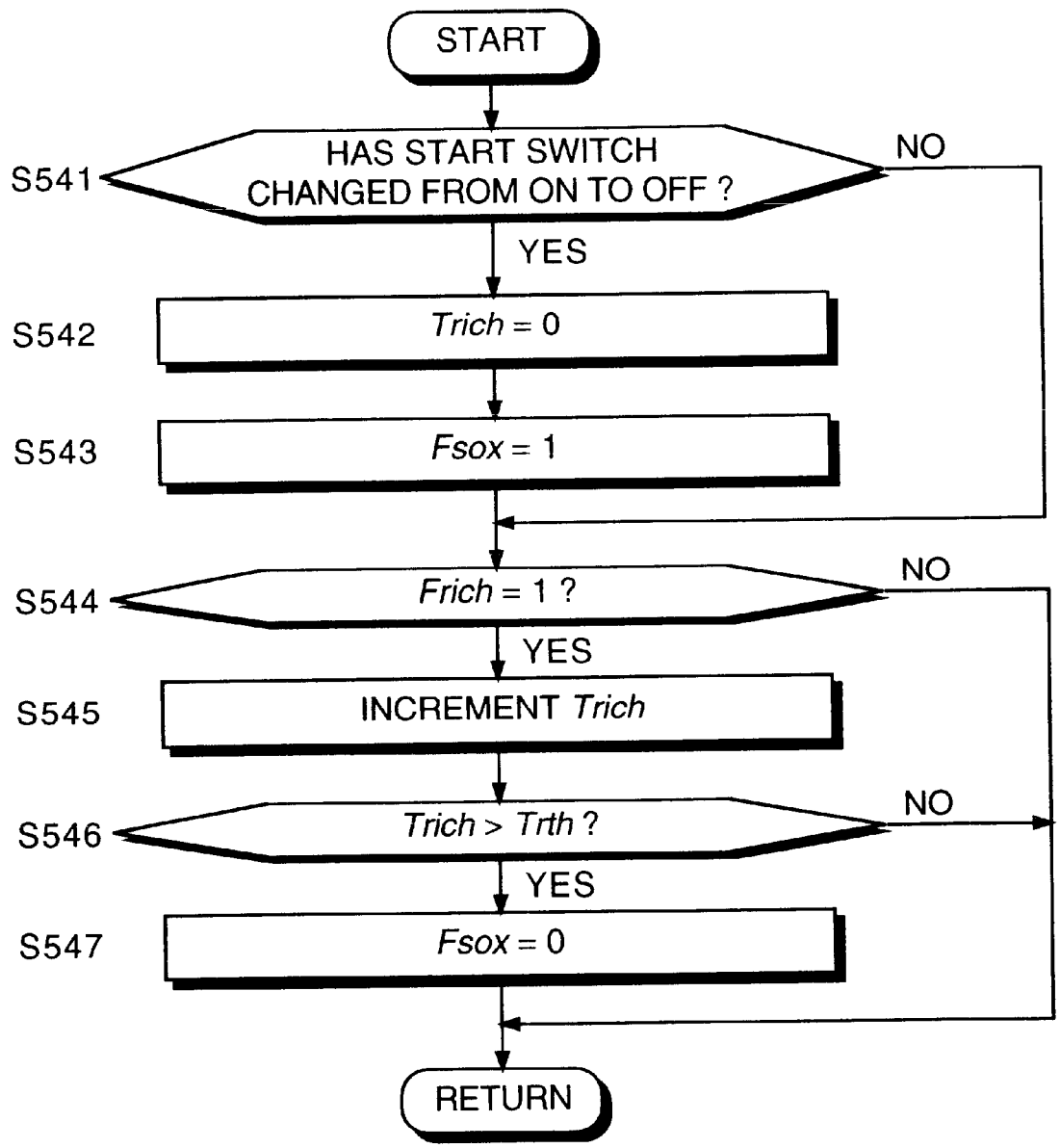
FIG. 18 is similar to FIG. 4, but showing a third embodiment of this invention.

This embodiment has a further modification in that the sulfur oxide discharge determining routine of the second embodiment is replaced by the routine shown in FIG. 18.

This routine is also performed by the controller 10 at an interval of 10 milliseconds. The essential feature of this routine is that it is determined whether or not the internal combustion engine 1 has started, the sulfur oxide discharge flag Fsox is set to 1 immediately after engine start-up, and when the aforesaid counter value Trich is greater than the predetermined value Trth, the discharge flag Fsox is reset to 0.

In a step S541, it is determined whether or not the output signal from a starter switch 16 has changed from ON to OFF. When the starter switch 16 has changed from ON to OFF, after executing the steps S542 and S543, the routine proceeds to a step S544. In other cases, the routine proceeds immediately to the step S544.

In the step S542, the counter value Trich for measuring the elapsed time from when the enriching flag Frich was set to 1, is reset to 0. In the step S543, the discharge flag Fsox is set to 1.

In the step S544, it is determined whether or not the enriching flag Frich is 1. When Frich is 1, the routine proceeds to a step S545.

In the step S545, the counter value Trich is incremented, and in a step S546 the counter value Trich is compared with the predetermined value Trth.

When the counter value Trich is greater than the predetermined value Trth, the discharge flag Fsox is reset to 0 in a step S547 and the routine is terminated.

According to this process, when the internal combustion engine 1 has been running at a rich air-fuel ratio for a predetermined time, it is determined that discharge of sulfur oxides from the catalyst is complete.

On the other hand, when the enriching flag Frich is not 1 in the step 544, or when the counter value Trich is larger than the predetermined value Trth in the step S546, the routine is terminated without modifying the discharge flag Fsox.

According to this routine, discharge of sulfur oxides is performed only once regardless of the sulfur oxide stored amount of the catalyst immediately after start-up of the internal combustion engine 1. Therefore, the sulfur oxide stored amount of the catalyst when sulfur oxides begin to be discharged is not constant. Consequently, in order to make effective use of rich shift for discharging sulfur oxides, it is desirable to calculate the sulfur oxide stored amount, and to set the positive value PHOSR using the PHOSR setting routine of the first embodiment.

The contents of Tokugan Hei 11-87895, with a filing date of Mar. 30, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A catalyst temperature control device for use with an internal combustion engine, the engine comprising a combustion chamber, a fuel injector which injects fuel into the combustion chamber, a spark plug which ignites an air-fuel mixture inside the combustion chamber, an exhaust passage which discharges exhaust in the combustion chamber, and a catalyst provided in the exhaust passage for trapping nitrogen oxides in the exhaust from a fuel of mixture of a lean air-fuel ratio and reducing trapped nitrogen oxides in the exhaust from a fuel mixture of an air-fuel ratio other than the lean air-fuel ratio, the catalyst also trapping sulfur oxides in the exhaust when a catalyst temperature is less than a predetermined temperature, and discharging trapped sulfur oxides when the catalyst temperature is greater than the predetermined temperature, the device comprising:

a sensor which detects an engine running state;

a microprocessor programmed to:

determine whether or not a condition for discharging the sulfur oxides trapped by the catalyst is satisfied based on the running state; and control a fuel injection amount and a fuel injection timing of the fuel injector, when the discharging condition is satisfied, so as to generate a stratified air-fuel mixture in the combustion chamber, the stratified air-fuel mixture comprising a first layer surrounding the spark plug, the first layer comprising an atomized air-fuel mixture of a rich air-fuel ratio within an ignitable range, and a second layer leaner than the first layer situated outside the first layer; and a sensor which detects the catalyst temperature; and wherein the microprocessor is further programmed to control the fuel injection amount of the fuel injector, when the stratified air-fuel mixture is generated, such that the mean air-fuel ratio of the combustion chamber is maintained at the stoichiometric air-fuel ratio when the catalyst temperature is lower than a predetermined second temperature (Tcat2), and control the fuel injection amount of the fuel injector, when the stratified air-fuel mixture is generated, such that the mean air fuel-ratio of the combustion chamber is maintained at a rich air-fuel ratio when the catalyst temperature exceeds the second temperature (Tcat2).

2. A catalyst temperature control device as defined in claim 1, wherein the internal combustion engine further comprises a piston which performs an intake stroke, a compression stroke, a power stroke and an exhaust stroke, and the microprocessor is further programmed to control the fuel injection amount and the fuel injection timing of the fuel injector so as to generate the stratified air-fuel mixture by controlling the fuel injector to perform a first fuel injection in the intake stroke and perform a second fuel injection in the compression stroke.

3. A catalyst temperature control device as defined in claim 2, wherein an amount of fuel injected in the first fuel injection is set within a range from 50% to 90% of a total amount of fuel injected in the first fuel injection and in the second fuel injection.

4. A catalyst temperature control device as defined in claim 1, wherein the air-fuel ratio of the first layer is 9 to 13, and the air-fuel ratio of the second air-fuel layer is 16 to 28.

5. A catalyst temperature control device as defined in claim 1, wherein the microprocessor is further programmed to calculate a sulfur oxide stored amount of the catalyst based on the running state, and to determine that the discharging condition is satisfied when the sulfur oxide stored amount exceeds a predetermined amount.

6. A catalyst temperature control device as defined in claim 5, wherein the running state detecting sensor comprises a sensor which detects an engine rotation speed, a sensor which detects an engine load, and a sensor which detects the catalyst temperature, and the microprocessor is further programmed to calculate a sulfur oxide trapping amount trapped by the catalyst in unit time based on the engine rotation speed, the engine load, and the catalyst temperature, and to calculate the sulfur oxide stored amount by integrating the sulfur oxide trapping amount.

7. A catalyst temperature control device as defined in claim 1, wherein the running state detecting sensor comprises a NOx sensor which detects a nitrogen oxide concentration of the exhaust in the exhaust passage, and the microprocessor is further programmed to calculate a nitrogen oxide stored amount of the catalyst at a lean air-fuel ratio, and to determine that the discharging condition is satisfied when the nitrogen oxide stored amount exceeds a predetermined amount, and the nitrogen oxide concentration is greater than the predetermined concentration.

8. A catalyst temperature control device as defined in claim 1, wherein the running state detecting sensor comprises a sensor which detects an engine start-up, and the microprocessor is further programmed to determine that the discharging condition is satisfied when engine start-up has been detected.

9. A catalyst temperature control device as defined in claim 1, wherein the microprocessor is further programmed to control the fuel injection amount of the fuel injector, when the stratified air-fuel mixture is generated, such that the mean air-fuel ratio of the combustion chamber is maintained at the stoichiometric air-fuel ratio when the catalyst temperature is higher than a predetermined first temperature (Tcat1) which is lower than the predetermined second temperature (Tcat2).

10. A catalyst temperature control device as defined in claim 1, wherein the microprocessor is further programmed to control the fuel injection amount and the fuel injection timing of the fuel injector so as to stop generating the stratified air-fuel mixture in the combustion chamber when the catalyst temperature exceeds a third temperature (Tcat3) higher than the second temperature (Tcat2).

11. A catalyst temperature control device as defined in claim 1, wherein the internal combustion engine further comprises an exhaust valve disposed between the combustion chamber and the exhaust passage, and a variable valve mechanism which varies an opening timing of the exhaust valve, and the microprocessor is further programmed to control the variable valve mechanism so as to advance the opening timing of the exhaust valve when the fuel injection amount and the fuel injection timing of the fuel injector are controlled to generate the stratified air-fuel mixture in the combustion chamber.

12. A catalyst temperature control device for use with an internal combustion engine, the engine comprising a combustion chamber, fuel injector which injects fuel into the combustion chamber, a spark plug which ignites an air-fuel mixture inside the combustion chamber, an exhaust passage which discharges exhaust in the combustion chamber, and a catalyst provided in the exhaust passage for trapping nitrogen oxides in the exhaust from a fuel mixture of a lean air-fuel ratio and reducing trapped nitrogen oxides in the exhaust from a fuel mixture of an air-fuel ratio other than the lean air-fuel ratio, the catalyst also trapping sulfur oxides in the exhaust when a catalyst temperature is less than a predetermined temperature, and discharging trapped sulfur oxides when the catalyst temperature is greater than the predetermined temperature, the device comprising:

means for detecting an engine running state;

means for determining whether or not a condition for discharging the sulfur oxides trapped by the catalyst is satisfied based on the running state; and means for controlling a fuel injection amount and a fuel injection timing of the fuel injector, when the discharging condition is satisfied, so as to generate a stratified air-fuel mixture in the combustion chamber, the stratified air-fuel mixture comprising a first layer surrounding the spark plug, the first layer comprising an atomized air-fuel mixture of a rich air-fuel ratio within an ignitable range, and a second layer leaner than the first layer situated outside the first layer wherein the means for controlling controls the fuel injection amount of the fuel injector, when the stratified air-fuel mixture is generated, such that the mean air-fuel ratio of the combustion chamber is maintained at the stoichiometric air-fuel ratio when the catalyst temperature is lower than a predetermined second temperature (Tcat2), and controls the fuel injection amount of the fuel injector, when the stratified air-fuel mixture is generated, such that the mean air fuel-ratio of the combustion chamber is maintained at a rich air-fuel ratio when the catalyst temperature exceeds the second temperature (Tcat2).

13. A catalyst temperature control method for an internal combustion engine, the engine comprising a combustion chamber, a fuel injector which injects fuel into the combustion chamber, a spark plug which ignites an air-fuel mixture inside the combustion chamber, an exhaust passage which discharges exhaust in the combustion chamber, and a catalyst provided in the exhaust passage for trapping nitrogen oxides in the exhaust from a fuel mixture of a lean air-fuel ratio and reducing trapped nitrogen oxides in the exhaust from a fuel mixture of an air-fuel ratio other than the lean air-fuel ratio, the catalyst also trapping sulfur oxides in the exhaust when a catalyst temperature is less than a predetermined temperature, and discharging trapped sulfur oxides when the catalyst temperature is greater than the predetermined temperature, the method comprising:

detecting an engine running state;

determining whether or not a condition for discharging the sulfur oxides trapped by the catalyst is satisfied based on the running state; and controlling a fuel injection amount and a fuel injection timing of the fuel injector, when the discharging condition is satisfied, so as to generate a stratified air-fuel mixture in the combustion chamber, the stratified air-fuel mixture comprising a first layer surrounding the spark plug, the first layer comprising an atomized air-fuel mixture of a rich air-fuel within an ignitable range, and a second layer leaner than the first air-fuel layer situated outside the first layer, wherein the controlling a fuel injection amount further comprises controlling the fuel injection amount of the fuel injector, when the stratified air-fuel mixture is generated, such that the mean air-fuel ratio of the combustion chamber is maintained at the stoichiometric air-fuel ratio when the catalyst temperature is lower than a predetermined second temperature (Tcat2), and controlling the fuel injection amount of the fuel injector, when the stratified air-fuel mixture is generated, such that the mean air fuel-ratio of the combustion chamber is maintained at a rich air-fuel ratio when the catalyst temperature exceeds the second temperature (Tcat2).

14. An internal combustion engine, comprising:

a catalyst provided in an exhaust passage of the engine, the catalyst trapping sulfur oxides in exhaust gas;

a fuel injector that injects fuel into a combustion chamber of the engine; and a microprocessor programmed to:

determine whether a discharging condition for discharging trapped sulfur oxides in the catalyst is satisfied in accordance with an engine running state, and control a fuel injection of the fuel injector so as to generate a stratified air-fuel mixture in the combustion chamber when the discharging condition is satisfied, wherein the stratified air-fuel mixture has a rich air-fuel mixture portion around a spark plug and a lean air-fuel mixture portion surrounding the rich air-fuel ratio portion, and wherein a mean air-fuel ratio of the stratified air-fuel mixture generated in the combustion chamber is a stoichiometric air-fuel ratio when the catalyst temperature is lower than a second predetermined temperature, and the mean air-fuel ratio of the stratified air-fuel mixture generated in the combustion chamber is a rich air-fuel ratio when the catalyst temperature exceeds the second predetermined temperature.

15. An internal combustion engine as defined in claim 14, wherein the microprocessor is further programmed to control the fuel injection so as to perform a normal engine operation in accordance with the engine running state, even if the discharging condition is satisfied, when the catalyst temperature is lower than a first predetermined temperature which is lower than the second predetermined temperature.

16. An internal combustion engine as defined in claim 14, wherein the microprocessor is further programmed to control the fuel injection so as to stop generating the stratified air-fuel mixture when the catalyst temperature exceeds a third predetermined temperature which is higher than the second predetermined temperature.

17. An internal combustion engine as defined in claim 16, wherein the third predetermined temperature corresponds to an allowable maximum temperature of the catalyst.

18. An internal combustion engine as defined in claim 14, wherein the microprocessor is further programmed to control the fuel injection so as to generate a homogeneous air-fuel mixture, even if the discharging condition is satisfied, when the catalyst temperature exceeds a third predetermined temperature.

19. An internal combustion engine as defined in claim 18, wherein the homogeneous air-fuel mixture is a rich air-fuel ratio.

20. An internal combustion engine as defined in claim 14, wherein the second predetermined temperature corresponds to a sulfur oxides discharge temperature of the catalyst.

21. An internal combustion engine as defined in claim 14, wherein the fuel injector injects fuel directly into the combustion chamber, and the microprocessor is further programmed to control the fuel injection so as to generate the stratified air-fuel mixture by performing a first fuel injection in an intake stroke and a second fuel injection in a compression stroke.

22. An internal combustion engine as defined in claim 21, wherein an amount of the first fuel injection is set within a range from 50% to 90% of a total amount of the first fuel injection and the second fuel injection.

23. An internal combustion engine as defined in claim 14, wherein the air-fuel ratio of the rich air-fuel mixture portion is 9 to 13, and the air-fuel ratio of the lean air-fuel mixture portion is 16 to 28.

24. An internal combustion engine as defined in claim 14, wherein the microprocessor is further programmed to calculate an amount of the trapped sulfur oxides in the catalyst based on the engine running state, and to determine that the discharging condition is satisfied when the amount of the trapped sulfur oxides exceeds a predetermined amount.

25. An internal combustion engine as defined in claim 14, wherein the microprocessor is further programmed to calculate an amount of the trapped sulfur oxides in the catalyst based on an engine rotation speed, an engine load and a catalyst temperature, and to determine that the discharging condition is satisfied when the amount of the trapped sulfur oxides exceeds a predetermined amount.

26. An internal combustion engine as defined in claim 14, wherein the engine further comprises a NOx sensor that detects NOx concentration of exhaust gas discharged from the catalyst, wherein the catalyst traps NOx in exhaust gas, and wherein the microprocessor is further programmed to calculate an amount of a trapped NOx in the catalyst in accordance with the engine running condition, and to determine the discharging condition of the sulfur oxides based on the amount of the trapped NOx and the NOx concentration detected by the NOx sensor.

27. An internal combustion engine as defined in claim 14, wherein the microprocessor is further programmed to determine that the discharging condition of the sulfur oxides is satisfied when a start-up condition of the engine is detected.

28. An internal combustion engine as defined in claim 14, wherein the engine further comprises a variable valve mechanism which varies an opening timing of an exhaust valve, and wherein the microprocessor is further programmed to control the variable valve mechanism so as to advance the opening timing of the exhaust gas when the stratified air-fuel mixture is generated.

* * * * *